United States Patent
Huang et al.

(10) Patent No.: US 11,582,002 B2
(45) Date of Patent: Feb. 14, 2023

(54) COORDINATION FOR PARTIAL RECIPROCITY ESTIMATION

(71) Applicant: QUALCOMM Incorporated, San Diego, CA (US)

(72) Inventors: Yi Huang, San Diego, CA (US); Wei Yang, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/072,347

(22) Filed: Oct. 16, 2020

(65) Prior Publication Data
US 2021/0119749 A1    Apr. 22, 2021

Related U.S. Application Data

(60) Provisional application No. 62/924,659, filed on Oct. 22, 2019.

(51) Int. Cl.
*H04L 5/00* (2006.01)
*H04W 72/04* (2023.01)

(52) U.S. Cl.
CPC ......... *H04L 5/0048* (2013.01); *H04W 72/042* (2013.01)

(58) Field of Classification Search
CPC .................... H04L 5/0048; H04W 72/042
See application file for complete search history.

(56) References Cited

U.S. PATENT DOCUMENTS

| | | | |
|---|---|---|---|
| 11,196,524 B2 * | 12/2021 | Bai | H04L 1/0026 |
| 2004/0082356 A1 | 4/2004 | Walton et al. | |
| 2010/0238824 A1 * | 9/2010 | Farajidana | H04B 7/0632 370/278 |
| 2016/0080052 A1 * | 3/2016 | Li | H04B 7/0456 375/267 |

(Continued)

FOREIGN PATENT DOCUMENTS

WO    WO-2018126473 A1    7/2018

OTHER PUBLICATIONS

Fukuzono H, et al., "Combining Calibration Schemes on a Real-Time Multiuser MIMO-OFDM System with Implicit Feedback", 2014 IEEE 25th Annual International Symposium on Personal, Indoor, and Mobile Radio Communication (PIMRC), IEEE, Sep. 2, 2014 (Sep. 2, 2014), pp. 11-15. XP032789473, DOI:10.1109/PIMRC.2014.7136123 [retrieved on Jun. 25, 2015] Sections I and II.D.

(Continued)

*Primary Examiner* — Duc C Ho
(74) *Attorney, Agent, or Firm* — Holland & Hart LLP

(57) ABSTRACT

Methods, systems, and devices for wireless communications are described. A first device may receive a first reference signal from a second device and may generate a channel status feedback message based on the first reference signal. The first device may bundle the second reference signal and the channel status feedback message and may transmit the second reference signal and the channel status feedback to the second device. The first device may initiate a data transfer with the second device based on transmitting the second reference signal and the channel status feedback message.

30 Claims, 18 Drawing Sheets

(56) References Cited

U.S. PATENT DOCUMENTS

2018/0048492 A1    2/2018  Kundargi et al.
2018/0145737 A1*   5/2018  Rahman ............... H04B 7/0626

OTHER PUBLICATIONS

International Search Report and Written Opinion—PCT/US2020/056299—ISA/EPO—dated Feb. 9, 2021.
Qualcomm Europe: "Calibration Procedures for TDD Beamforming", 3GPP Draft, R1-080494, 3GPP TSG RAN1 #51, 3RD Generation Partnershipproject (3GPP), Mobile Competence Centre, 650, Route Des Lucioles, F-06921 Sophia-AntipolisCedex, France, vol. RAN WG1, No. Sevilla, Spain, Jan. 9, 2008, Jan. 9, 2008 (Jan. 9, 2008), XP050109010, pp. 1-6, [retrieved on Jan. 9, 2008] Section 4.

* cited by examiner

COORDINATION FOR PARTIAL RECIPROCITY ESTIMATION

CROSS REFERENCE

The present application for patent claims the benefit of U.S. Provisional Patent Application No. 62/924,659 by HUANG et al., entitled "COORDINATION FOR PARTIAL RECIPROCITY ESTIMATION," filed Oct. 22, 2019, assigned to the assignee hereof, and expressly incorporated by reference herein.

FIELD OF TECHNOLOGY

The present disclosure relates generally to wireless communications and more specifically to coordination for partial reciprocity estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a user equipment (UE) may perform communications with a base station. For instance, the UE may transmit a physical uplink shared channel (PUSCH) to the base station that conveys data. Alternatively, the base station may transmit a physical downlink shared channel (PDSCH) to the UE that conveys data.

SUMMARY

The described techniques relate to improved methods, systems, devices, and apparatuses that support coordination for partial reciprocity estimation. Generally, the described techniques provide for a first device to receive a first reference signal from a second device and to generate a channel status feedback message based on the first reference signal. The first device may bundle the second reference signal and the channel status feedback message and may transmit the second reference signal and the channel status feedback to the second device. The first device may initiate a data transfer with the second device based on transmitting the second reference signal and the channel status feedback message.

A method of wireless communications at a first device is described. The method may include receiving a first reference signal from a second device, generating a channel status feedback message based on the first reference signal, bundling a second reference signal and the channel status feedback message, transmitting the second reference signal and the channel status feedback message to the second device, and initiating a data transfer with the second device based on transmitting the second reference signal and the channel status feedback message.

An apparatus for wireless communications at a first device is described. The apparatus may include a processor, memory coupled with the processor, and instructions stored in the memory. The instructions may be executable by the processor to cause the apparatus to receive a first reference signal from a second device, generate a channel status feedback message based on the first reference signal, bundle a second reference signal and the channel status feedback message, transmit the second reference signal and the channel status feedback message to the second device, and initiate a data transfer with the second device based on transmitting the second reference signal and the channel status feedback message.

Another apparatus for wireless communications at a first device is described. The apparatus may include means for receiving a first reference signal from a second device, generating a channel status feedback message based on the first reference signal, bundling a second reference signal and the channel status feedback message, transmitting the second reference signal and the channel status feedback message to the second device, and initiating a data transfer with the second device based on transmitting the second reference signal and the channel status feedback message.

A non-transitory computer-readable medium storing code for wireless communications at a first device is described. The code may include instructions executable by a processor to receive a first reference signal from a second device, generate a channel status feedback message based on the first reference signal, bundle a second reference signal and the channel status feedback message, transmit the second reference signal and the channel status feedback message to the second device, and initiate a data transfer with the second device based on transmitting the second reference signal and the channel status feedback message.

Some examples of the method, apparatuses, and non-transitory computer-readable medium described herein may further include operations, features, means, or instructions for receiving a third reference signal after transmitting the channel status feedback message, and transmitting a shared channel transmission as part of the data transfer based on receiving the third reference signal and the channel status feedback message.

Some examples of the method, apparatuses, and non-transitory computer-readable medium described herein may further include operations, features, means, or instructions for receiving signaling indicating a relationship between an uplink channel matrix and a downlink channel matrix, and transmitting the shared channel transmission based on receiving the signaling indicating the relationship between the uplink channel matrix and the downlink channel matrix.

Some examples of the method, apparatuses, and non-transitory computer-readable medium described herein may further include operations, features, means, or instructions for determining a first channel matrix based on the relationship between the uplink channel matrix and the downlink channel matrix, and transmitting the shared channel transmission based on the determined first channel matrix.

Some examples of the method, apparatuses, and non-transitory computer-readable medium described herein may further include operations, features, means, or instructions for determining a second channel matrix based on receiving the third reference signal, and determining the first channel matrix based on the second channel matrix.

In some examples of the method, apparatuses, and non-transitory computer-readable medium described herein, the first channel matrix may be the uplink channel matrix and the second channel matrix may be the downlink channel matrix.

In some examples of the method, apparatuses, and non-transitory computer-readable medium described herein, the first channel matrix may be the downlink channel matrix and the second channel matrix may be the uplink channel matrix.

In some examples of the method, apparatuses, and non-transitory computer-readable medium described herein, the relationship between the uplink channel matrix and the downlink channel matrix may be received via a medium access control control element.

In some examples of the method, apparatuses, and non-transitory computer-readable medium described herein, the relationship between the uplink channel matrix and the downlink channel matrix may be received via an uplink shared channel transmission.

Some examples of the method, apparatuses, and non-transitory computer-readable medium described herein may further include operations, features, means, or instructions for determining a precoding matrix index based on the third reference signal and transmitting the channel status feedback message, and transmitting the shared channel transmission based on determining the precoding matrix index, where the shared channel transmission may be a downlink shared channel transmission.

Some examples of the method, apparatuses, and non-transitory computer-readable medium described herein may further include operations, features, means, or instructions for transmitting a fourth reference signal to the second device, where the fourth reference signal may be precoded based on receiving the third reference signal.

In some examples of the method, apparatuses, and non-transitory computer-readable medium described herein, the third reference signal may be a channel state information reference signal.

In some examples of the method, apparatuses, and non-transitory computer-readable medium described herein, the fourth reference signal may be a sounding reference signal.

Some examples of the method, apparatuses, and non-transitory computer-readable medium described herein may further include operations, features, means, or instructions for receiving a scheduling request indicator from the second device based on transmitting the precoded fourth reference signal.

In some examples of the method, apparatuses, and non-transitory computer-readable medium described herein, the scheduling request indicator may be received via downlink control information.

In some examples of the method, apparatuses, and non-transitory computer-readable medium described herein, the third reference signal may be a sounding reference signal.

Some examples of the method, apparatuses, and non-transitory computer-readable medium described herein may further include operations, features, means, or instructions for transmitting a third reference signal, and receiving a shared channel transmission as part of the data transfer based on transmitting the channel status feedback message and the third reference signal.

Some examples of the method, apparatuses, and non-transitory computer-readable medium described herein may further include operations, features, means, or instructions for receiving a fourth reference signal, where the third reference signal may be based on transmitting the third reference signal and the channel status feedback message.

In some examples of the method, apparatuses, and non-transitory computer-readable medium described herein, the fourth reference signal may be a sounding reference signal.

Some examples of the method, apparatuses, and non-transitory computer-readable medium described herein may further include operations, features, means, or instructions for transmitting a scheduling request indicator based on transmitting the channel status feedback message and the third reference signal, where receiving the shared channel transmission may be based on transmitting the scheduling request indicator.

In some examples of the method, apparatuses, and non-transitory computer-readable medium described herein, the scheduling request indicator may be transmitted via downlink control information.

In some examples of the method, apparatuses, and non-transitory computer-readable medium described herein, the third reference signal may be a sounding reference signal, and where the shared channel transmission may be a downlink shared channel transmission.

In some examples of the method, apparatuses, and non-transitory computer-readable medium described herein, the third reference signal may be a channel state information reference signal, and where the shared channel transmission may be an uplink shared channel transmission.

In some examples of the method, apparatuses, and non-transitory computer-readable medium described herein, the first reference signal may be received and the second reference signal and the channel status feedback message may be transmitted as part of a first training procedure, and a second training procedure performed after the first training procedure may include operations, features, means, or instructions for receiving a third reference signal from the second device, generating a second channel status feedback message based on receiving the third reference signal, bundling a fourth reference signal and the second channel status feedback message, and transmitting the fourth reference signal and the second channel status feedback message to the second device.

In some examples of the method, apparatuses, and non-transitory computer-readable medium described herein, the first training procedure and the second training procedure may be training procedures of a set of periodic training procedures for the first device.

In some examples of the method, apparatuses, and non-transitory computer-readable medium described herein the second reference signal and the channel status feedback message may be transmitted as part of a training procedure, and may further include operations, features, means, or instructions for transmitting a set of reference signals including the second reference signal and a set of channel status feedback messages including the channel status feedback message as part of the training procedure, where each reference signal of the set of reference signals may be bundled with a corresponding channel status feedback message of the set of channel status feedback messages, and where initiating the data transfer may be based on transmitting the set of reference signals and the set of channel status feedback messages.

Some examples of the method, apparatuses, and non-transitory computer-readable medium described herein may further include operations, features, means, or instructions for determining a channel matrix based on the first reference signal, where initiating the data transfer may be based on the channel status feedback message including the indication of the channel matrix.

Some examples of the method, apparatuses, and non-transitory computer-readable medium described herein may further include operations, features, means, or instructions for determining one or more parameters, one or more coefficients, or a combination thereof usable to derive a channel matrix based on the first reference signal, where initiating the data transfer may be based on the channel status feedback message including an indication of the one or more parameters, an indication of the one or more coefficients, or a combination thereof.

In some examples of the method, apparatuses, and non-transitory computer-readable medium described herein, the first reference signal includes a sounding reference signal, the second reference signal includes a channel state information reference signal, the first device may be a base station, and the second device may be a UE.

In some examples of the method, apparatuses, and non-transitory computer-readable medium described herein, the first reference signal includes a channel state information reference signal, the second reference signal includes a sounding reference signal, the first device may be a UE, and the second device may be a base station.

A method of wireless communications at a first device is described. The method may include transmitting a first reference signal to a second device, receiving a second reference signal bundled with a channel status feedback message from the second device based on transmitting the first reference signal, and initiating data transfer with the second device based on receiving the second reference signal bundled with the channel status feedback message.

An apparatus for wireless communications at a first device is described. The apparatus may include a processor, memory coupled with the processor, and instructions stored in the memory. The instructions may be executable by the processor to cause the apparatus to transmit a first reference signal to a second device, receive a second reference signal bundled with a channel status feedback message from the second device based on transmitting the first reference signal, and initiate data transfer with the second device based on receiving the second reference signal bundled with the channel status feedback message.

Another apparatus for wireless communications at a first device is described. The apparatus may include means for transmitting a first reference signal to a second device, receiving a second reference signal bundled with a channel status feedback message from the second device based on transmitting the first reference signal, and initiating data transfer with the second device based on receiving the second reference signal bundled with the channel status feedback message.

A non-transitory computer-readable medium storing code for wireless communications at a first device is described. The code may include instructions executable by a processor to transmit a first reference signal to a second device, receive a second reference signal bundled with a channel status feedback message from the second device based on transmitting the first reference signal, and initiate data transfer with the second device based on receiving the second reference signal bundled with the channel status feedback message.

Some examples of the method, apparatuses, and non-transitory computer-readable medium described herein may further include operations, features, means, or instructions for transmitting a third reference signal after receiving the channel status feedback message from the second device, and receiving a shared channel transmission based on transmitting the third reference signal.

Some examples of the method, apparatuses, and non-transitory computer-readable medium described herein may further include operations, features, means, or instructions for determining a relationship between an uplink channel matrix and a downlink channel matrix, and transmitting signaling indicating the relationship between the uplink channel matrix and the downlink channel matrix to the second device, where receiving the shared channel transmission may be based on transmitting the signaling indicating the relationship between the uplink channel matrix and the downlink channel matrix.

In some examples of the method, apparatuses, and non-transitory computer-readable medium described herein, the relationship between the uplink channel matrix and the downlink channel matrix may be transmitted via medium access control control element signaling.

In some examples of the method, apparatuses, and non-transitory computer-readable medium described herein, the relationship between the uplink channel matrix and the downlink channel matrix may be transmitted via an uplink shared channel transmission.

Some examples of the method, apparatuses, and non-transitory computer-readable medium described herein may further include operations, features, means, or instructions for receiving a fourth reference signal, where the fourth reference signal may be based on transmitting the third reference signal and receiving the channel status feedback message.

In some examples of the method, apparatuses, and non-transitory computer-readable medium described herein, the fourth reference signal may be a sounding reference signal.

Some examples of the method, apparatuses, and non-transitory computer-readable medium described herein may further include operations, features, means, or instructions for transmitting a scheduling request indicator based on receiving the channel status feedback message and transmitting the third reference signal, where receiving the shared channel transmission may be based on transmitting the scheduling request indicator.

In some examples of the method, apparatuses, and non-transitory computer-readable medium described herein, the scheduling request indicator may be transmitted via downlink control information.

In some examples of the method, apparatuses, and non-transitory computer-readable medium described herein, the third reference signal may be a sounding reference signal, and where the shared channel transmission may be a downlink shared channel transmission.

In some examples of the method, apparatuses, and non-transitory computer-readable medium described herein, the third reference signal may be a channel state information reference signal, and where the shared channel transmission may be an uplink shared channel transmission.

Some examples of the method, apparatuses, and non-transitory computer-readable medium described herein may further include operations, features, means, or instructions for receiving a third reference signal after receiving the channel status feedback message from the second device, and transmitting a shared channel transmission based on receiving the third reference signal.

Some examples of the method, apparatuses, and non-transitory computer-readable medium described herein may further include operations, features, means, or instructions for determining a relationship between an uplink channel matrix and a downlink channel matrix based on receiving the channel status feedback message, and transmitting the shared channel transmission based on determining the relationship between the uplink channel matrix and the downlink channel matrix.

Some examples of the method, apparatuses, and non-transitory computer-readable medium described herein may further include operations, features, means, or instructions for determining a first channel matrix based on determining the relationship between the uplink channel matrix and the downlink channel matrix, and transmitting the shared channel transmission based on determining the first channel matrix.

Some examples of the method, apparatuses, and non-transitory computer-readable medium described herein may further include operations, features, means, or instructions for determining a second channel matrix based on receiving the second reference signal, and determining the first channel matrix based on the second channel matrix.

In some examples of the method, apparatuses, and non-transitory computer-readable medium described herein, the first channel matrix may be the uplink channel matrix and where the second channel matrix may be the downlink channel matrix.

In some examples of the method, apparatuses, and non-transitory computer-readable medium described herein, the first channel matrix may be the downlink channel matrix and where the second channel matrix may be the uplink channel matrix.

Some examples of the method, apparatuses, and non-transitory computer-readable medium described herein may further include operations, features, means, or instructions for determining a precoding matrix index based on the second reference signal and receiving the channel status feedback message, and transmitting the shared channel transmission based on determining the precoding matrix index, where the shared channel transmission may be a downlink shared channel transmission.

Some examples of the method, apparatuses, and non-transitory computer-readable medium described herein may further include operations, features, means, or instructions for transmitting a fourth reference signal to the second device, where the fourth reference signal may be precoded based on receiving the third reference signal.

In some examples of the method, apparatuses, and non-transitory computer-readable medium described herein, the third reference signal may be a channel state information reference signal.

In some examples of the method, apparatuses, and non-transitory computer-readable medium described herein, the fourth reference signal may be a sounding reference signal.

Some examples of the method, apparatuses, and non-transitory computer-readable medium described herein may further include operations, features, means, or instructions for receiving a scheduling request indicator based on receiving the channel status feedback message and the third reference signal, where transmitting the shared channel transmission may be based on the scheduling request indicator.

In some examples of the method, apparatuses, and non-transitory computer-readable medium described herein, the scheduling request indicator may be received via downlink control information.

In some examples of the method, apparatuses, and non-transitory computer-readable medium described herein, the third reference signal may be a sounding reference signal.

In some examples of the method, apparatuses, and non-transitory computer-readable medium described herein, the first reference signal and the channel status feedback message may be received as part of a first training procedure, and a second training procedure performed after the first training procedure may include operations, features, means, or instructions for transmitting a third reference signal to the second device, and receiving a fourth reference signal bundled with a second channel status feedback message from the second device based on transmitting the third reference signal.

In some examples of the method, apparatuses, and non-transitory computer-readable medium described herein, the first training procedure and the second training procedure may be training procedures of a set of periodic training procedures for the first device.

In some examples of the method, apparatuses, and non-transitory computer-readable medium described herein, the second reference signal and the channel status feedback message may be received as part of a training procedure, and may further include operations, features, means, or instructions for receiving a set of reference signals including the second reference signal and a set of channel status feedback messages including the channel status feedback message as part of the training procedure, where each reference signal of the set of reference signals may be bundled with a corresponding channel status feedback message of the set of channel status feedback messages, and where initiating the data transfer may be based on receiving the set of reference signals and the set of channel status feedback messages.

Some examples of the method, apparatuses, and non-transitory computer-readable medium described herein may further include operations, features, means, or instructions for determining a channel matrix based on the second reference signal, where initiating the data transfer may be based on the channel status feedback message including the indication of the channel matrix.

Some examples of the method, apparatuses, and non-transitory computer-readable medium described herein may further include operations, features, means, or instructions for determining one or more parameters, one or more coefficients, or a combination thereof usable to derive a channel matrix based on the second reference signal, where initiating the data transfer may be based on the channel status feedback message including an indication of the one or more parameters, an indication of the one or more coefficients, or a combination thereof.

In some examples of the method, apparatuses, and non-transitory computer-readable medium described herein, the first reference signal includes a sounding reference signal, the second reference signal includes a channel state information reference signal, the first device may be a UE, and the second device may be a base station.

In some examples of the method, apparatuses, and non-transitory computer-readable medium described herein, the first reference signal includes a channel state information reference signal, the second reference signal includes a sounding reference signal, the first device may be a base station, and the second device may be a UE.

DETAILED DESCRIPTION

Figure 1:
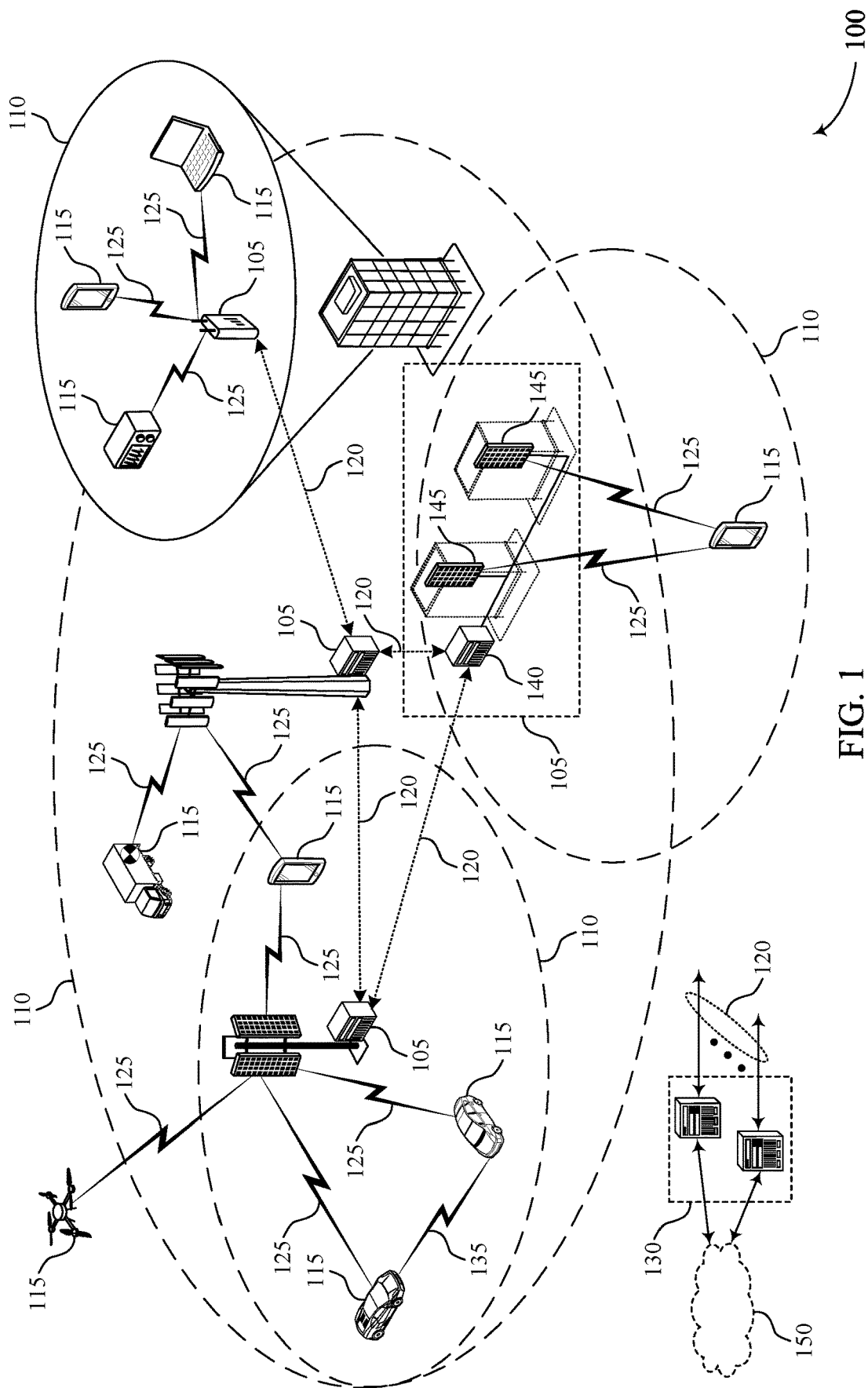
FIG. 1 illustrates an example of a system for wireless communications that supports coordination for partial reciprocity estimation in accordance with aspects of the present disclosure.

In some cases, a first wireless device (e.g., a user equipment (UE) or a base station) may perform a data transfer with a second wireless device (e.g., another UE or base station). For instance, the first wireless device may transmit a shared channel transmission to the second wireless device. To aid in transmitting the shared channel transmission, the second wireless device may transmit a reference signal to the first wireless device. The first wireless device, upon receiving the reference signal, may determine a channel matrix associated with the channel from which the reference signal was received.

If the channel for receiving the reference signal has a same reciprocity (e.g., a same center frequency) as the channel for transmitting the shared channel transmission, the first wireless device may determine that channel conditions for the channel for receiving the reference signal are similar enough to channel conditions for the channel for transmitting the shared channel transmission that the channel matrix for the channel for receiving the reference signal is approximately the same as another channel matrix for the channel for transmitting the shared channel transmission. As such, the first wireless device may use the determined channel matrix to perform precoding for transmitting the shared channel transmission.

However, in cases where the channel for transmitting the reference signal and the channel for transmitting the shared channel transmission have different reciprocities, channel conditions for the channel for transmitting the reference signal may differ from channel conditions for the channel for transmitting the shared channel transmission. As such, if the first wireless device determines that the channel matrix for the channel for receiving the reference signal is approximately the same as the channel matrix for the channel for transmitting the shared channel transmission, the first wireless device may perform precoding that ineffectively accounts for the differences between the actual channel matrices.

To account for such differences, the first wireless device and the second wireless device may perform a training procedure that involves one of the wireless devices transmitting a first reference signal to the other wireless device, where the other wireless device may determine a channel matrix for the channel of the first reference signal. The other wireless device, in turn, may transmit a second reference signal to the one wireless device, which the one wireless device may use to determine a channel matrix for the channel for the second reference signal. Additionally, the other wireless device may bundle a channel status feedback (CSF) message with the second reference signal that includes an indication of the channel matrix for the channel of the first reference signal.

By determining the channel matrix for the channel for the second reference signal and receiving the indication of the channel matrix for the channel of the first reference signal, the other wireless device may determine a relationship between the channel matrix for the channel for the second reference signal and the channel matrix for the channel for the first reference signal. In some cases, the other wireless device may transmit the indication of the relationship to the one wireless device.

Having access to the relationship may enable the first wireless device to more accurately determine the channel matrix for the channel for transmitting the shared channel transmission. For instance, the relationship and the channel matrix for receiving the reference signal may be used together to determine an estimation of the channel matrix for transmitting the shared channel transmission. The estimation may more closely model the actual channel matrix for the channel for transmitting the shared channel transmission.

Aspects of the disclosure are initially described in the context of wireless communications systems. Additional aspects of the disclosure are described in the context of an additional wireless communications system, communications schemes, and a process flow. Aspects of the disclosure are further illustrated by and described with reference to apparatus diagrams, system diagrams, and flowcharts that relate to coordination for partial reciprocity estimation.

FIG. 1 illustrates an example of a wireless communications system 100 that supports coordination for partial reciprocity estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the methods as described herein may enable a first device (e.g., a UE 115 or a base station 105) to receive a first reference signal from a second device (e.g., a UE 115 or a base station 105) and to generate a channel status feedback message based on the first reference signal. The first device may bundle the second reference signal and the channel status feedback message and may transmit the second reference signal and the channel status feedback to the second device. The first device may initiate a data transfer with the second device based on transmitting the second reference signal and the channel status feedback message.

Figure 2:
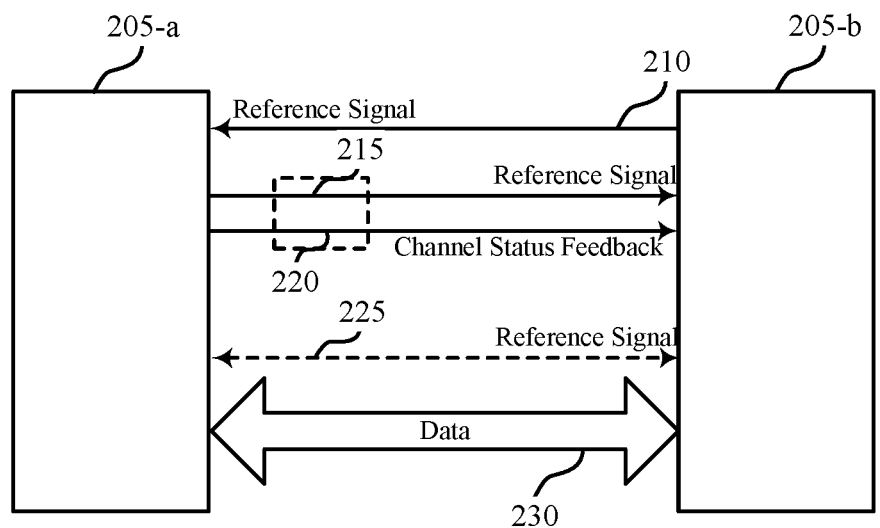
FIG. 2 illustrates an example of a wireless communications system that supports coordination for partial reciprocity estimation in accordance with aspects of the present disclosure.

FIG. 2 illustrates an example of a wireless communications system 200 that supports coordination for partial reciprocity estimation in accordance with aspects of the present disclosure. In some examples, wireless communications system 200 may implement aspects of wireless communications system 100. For instance, wireless devices 205-a and 205-b may each be an example of a UE 115 or a base station 105 as described with reference to FIG. 1.

Wireless devices 205-a and 205-b may perform a training procedure. Performing the training procedure may involve wireless device 205-b transmitting a reference signal 210 to wireless device 205-a. Wireless device 205-a, upon receiving the reference signal 210 may determine a channel matrix $H_1$. If wireless device 205-b transmits the reference signal 210 using M antennas and wireless device 205-a is configured to use N antennas to receive the reference signal 210, the channel matrix $H_1$ may have M columns and N rows. A value of an entry of $H_1$ at an mth column and an nth row may correspond to an amplitude or power of the reference signal 210 received at an nth antenna of wireless device 205-a from an mth antenna of wireless device 205-b.

Additionally, performing the training procedure may involve wireless device 205-a transmitting a reference signal 215 to wireless device 205-b. Wireless device 205-b, upon receiving the reference signal 215 may determine a channel matrix $H_2$. If wireless device 205-a transmits the reference signal 215 using X antennas and wireless device 205-b is configured to receive the reference signal 215 using Y antennas, the channel matrix $H_2$ may have X columns and Y rows. A value of an entry of $H_2$ at an xth column and an yth row may correspond to an amplitude or power of the reference signal 210 received at an yth antenna of wireless device 205-b from an xth antenna of wireless device 205-a.

In some cases, wireless device 205-a may determine that channel conditions for transmissions from wireless device 205-a to wireless device 205-b are approximately the same as channel conditions for transmissions from wireless device 205-b to wireless device 205-a. Similarly, wireless device 205-b may determine that channel conditions for transmissions from wireless device 205-b to wireless device 205-a are approximately the same as channel conditions for transmissions from wireless device 205-a to wireless device 205-b. Wireless devices 205-a and/or 205-b may make this determination if a channel for carrying transmissions from wireless device 205-a to wireless device 205-b has a same center frequency as a channel for carrying transmissions from wireless device 205-b to wireless device 205-a.

In such cases, wireless device 205-a may determine that $H_1 \approx H_2$ and/or wireless device 205-b may determine that $H_2 \approx H_1$ if M=Y and N=X. Additionally or alternatively, wireless devices may determine that $H_1 \approx H_2$ if the antennas of wireless device 205-a used to transmit reference signal 215 are the same as the antennas of wireless device 205-a used to receive reference signal 210, the antennas of wireless device 205-b used to transmit reference signal 210 are the same as the antennas of wireless device 205-b used to receive reference signal 215, or a combination thereof. By assuming that $H_2 \approx H_1$, wireless devices 205-a may be capable of accounting for a channel for transmissions from wireless device 205-a to wireless device 205-b when transmitting transmissions. Similarly, wireless device 205-b may be capable of accounting for a channel for transmissions from wireless device 205-b to wireless device 205-a when transmitting transmissions.

However, in some cases, ideal or full reciprocity between a first channel for carrying transmissions from wireless device 205-a to wireless device 205-b and a second channel for carrying transmissions from wireless device 205-b to wireless device 205-a may not be available. For instance, the first and second channel may be in different bands or may have different center frequencies in the same band. The first and second channels may be in the same band and have different center frequencies or may be in different bands completely (e.g., in frequency domain duplexing (FDD) systems). In such cases, wireless device 205-a determining that $H_1 \approx H_2$ or wireless device 205-b determining that $H_2 \approx H_1$ may enable inefficient communications, as the channel conditions of the first and second channels may vary significantly.

For instance, certain MIMO transmission procedures may at least partially rely on the reciprocity between the first and second channels being ideal. In one example, a wireless device 205 may derive a precoding matrix for a physical downlink shared channel (PDSCH) by performing uplink sounding using a sounding reference signal (SRS) if the channel for receiving the SRS is fully reciprocal with the channel for transmitting the PDSCH. Additionally or alternatively, a wireless device 205 may receive a precoded SRS from another wireless device 205 after transmitting a CSI-RS if the channel for transmitting the CSI-RS is fully reciprocal with the channel for receiving the precoded SRS, which may assist in the wireless device 205 transmitting non-codebook based PUSCH transmissions.

To account for the first and second channels without full reciprocity (e.g., channels having partial reciprocity), wireless device 205-a may bundle reference signal 215 with channel status feedback (CSF) 220 and may transmit the reference signal 215 with the CSF 220. CSF 220 may provide a raw or full indication of $H_1$ or may indicate coefficients and/or parameters usable by wireless device 205-b to determine $H_1$. The coefficients and/or parameters may be extracted based on a set of common basis or vectors identified at both wireless device 205-a and wireless device 205-b. Wireless device 205-b, after receiving the CSF indicating $H_1$ and determining $H_2$ from reference signal 215, may determine a relationship D between $H_1$ and $H_2$ that indicates the partial reciprocity between $H_1$ and $H_2$.

After the training procedure is completed, wireless device 205-a may transmit a reference signal 225 to wireless device 205-b. In such cases, reference signal 225 may be a same type of reference signal as reference signal 210. Wireless device 205-b, upon receiving reference signal 225, may determine $H_{2\_new}$. Using $H_{2\_new}$ and the relationship between $H_1$ and $H_2$, wireless device 205-b may determine $H_{1\_new}$. $H_{1\_new}$ may more accurately reflect channel conditions for transmissions carried from wireless device 205-b to wireless device 205-a. After determining $H_{1\_new}$, wireless device 205-b may transmit data 230 to wireless device 205-a based on $H_{1\_new}$. Use cases for $H_{1\_new}$ may be described with reference to FIGS. 3 and 6.

Alternatively, after the training procedure is completed, wireless device 205-b may transmit a reference signal 225 to wireless device 205-a. In such cases, reference signal 225 may be a same type of reference signal as reference signal 215. Wireless device 205-a, upon receiving reference signal 225, may determine $H_{1\_new}$. Using $H_{1\_new}$ and the relationship between $H_1$ and $H_2$, wireless device 205-b may determine $H_{2\_new}$. $H_{2\_new}$ may more accurately reflect channel conditions for transmissions carried from wireless device 205-a to wireless device 205-b. After determining $H_{2\_new}$, wireless device 205-a may transmit data 230 to wireless device 205-b based on $H_{2\_new}$. Use cases for $H_{2\_new}$ may be described with reference to FIGS. 4 and 5.

If wireless device 205-a is a UE 115 and wireless device 205-b is a base station 105, reference signal 210 may be a CSI-RS and reference signal 215 may be an SRS. In such cases, $H_1$ may be an uplink channel matrix $H_{ul}$ and $H_2$ may be a downlink channel matrix $H_{dl}$, where $H_1 = D \times H_2$. If reference signal 225 is transmitted from wireless device 205-a to wireless device 205-b, reference signal 225 may be an SRS and data 230 may be a PDSCH. More details about this scenario may be described with reference to FIG. 4. Alternatively, if reference signal 225 is transmitted from wireless device 205-b to wireless device 205-a, reference signal 225 may be a CSI-RS and data 230 may be a PUSCH. More details about this scenario may be described with reference to FIG. 7.

If wireless device 205-a is a base station 105 and wireless device 205-b is a UE 115, reference signal 210 may be an SRS and reference signal 215 may be a CSI-RS. In such cases, $H_1$ may be a downlink channel matrix $H_{dl}$ and $H_2$ may be an uplink channel matrix $H_{ul}$, where $H_2 = D \times H_1$. If reference signal 225 is transmitted from wireless device 205-a to wireless device 205-b, reference signal 225 may be a CSI-RS and data 230 may be a PUSCH. More details about this scenario may be described with reference to FIG. 6. Alternatively, if reference signal 225 is transmitted from wireless device 205-b to wireless device 205-a, reference signal 225 may be an SRS and data 230 may be a PDSCH. More details about this scenario may be described with reference to FIG. 5.

Generally, uplink and downlink channel matrices may change relatively quickly as compared to D, which may change more slowly. As such, by using D, wireless device 205-a or 205-b may acquire a better estimation of $H_{1\_new}$ or $H_{2\_new}$ as compared to determining that $H_{1\_new} \approx H_{2\_new}$ or that $H_{2\_new} \approx H_{1\_new}$, respectively. As such, wireless device 205-a and/or 205-b may be able to communicate shared channel transmissions while accounting for channel conditions more effectively.

Figure 3:
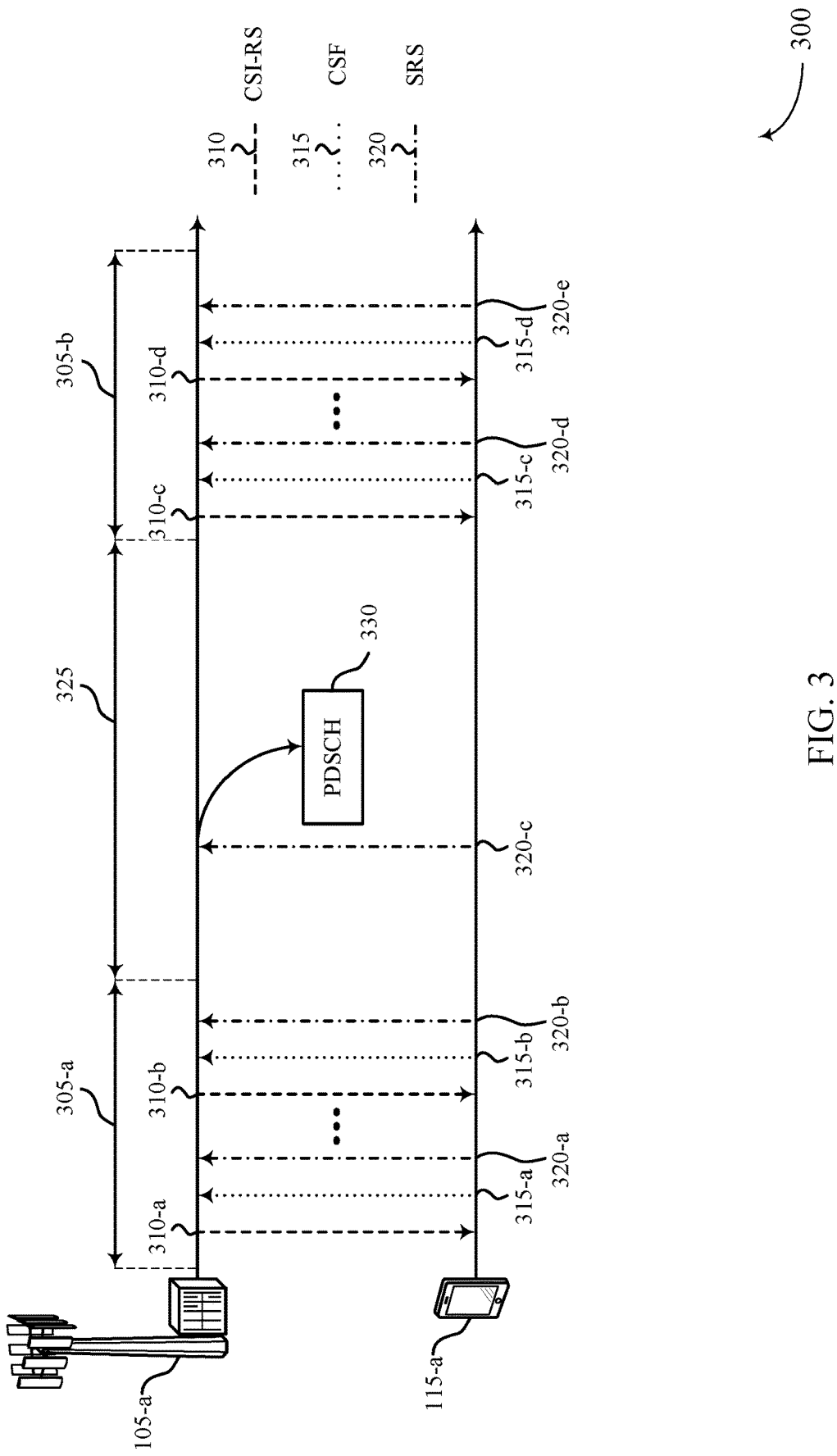
FIG. 3 illustrates an example of a communications scheme that supports coordination for partial reciprocity estimation in accordance with aspects of the present disclosure.

FIG. 3 illustrates an example of a communications scheme 300 that supports coordination for partial reciprocity estimation in accordance with aspects of the present disclosure. In some examples, communications scheme 300 may implement aspects of wireless communications system 100. For instance, base station 105-a may be an example of a base station 105 as described with reference to FIG. 1 and UE 115-a may be an example of a UE 115 as described with reference to FIG. 1.

Initially, UE 115-a and base station 105-a may perform training procedure 305-a. Training procedure 305-a may involve base station 105-a transmitting CSI-RS 310-a to UE 115-a. UE 115-a, upon receiving CSI-RS 310-a may determine $H_{dl1}$ (e.g., as described with reference to FIG. 2). UE 115-a may bundle a CSF 315-a indicating $H_{dl1}$ or one or more parameters and/or coefficients corresponding to $H_{dl1}$ with an SRS 320-a. Together CSF 315-a and SRS 320-a may form a (CSF, SRS) pair. UE 115-a may transmit the SRS 320-a bundled with the CSF 315-a to base station 105-a. Base station 105-a, upon receiving the SRS 320-a, may determine $H_{ul1}$.

Base station 105-a and UE 115-a may reperform the process of transmitting and receiving a CSI-RS 310 and SRS 320 bundled with a CSF 315 so that base station 105-a attains $H_{dl2}$ and $H_{ul2}$. In some cases, base station 105-a and UE 115-a may continue to reperform the process until base station 105-a attains $H_{dlP}$ and $H_{ulP}$ where P may be the number of times the process is reperformed. At the Pth occurrence, base station 105-a may transmit CSI-RS 310-b; UE 115-a may bundle CSF 315-b with SRS 320-b; and UE 115-a may transmit CSF 315-b with SRS 320-b to base station 105-a.

Base station 105-a may use the training procedure 305-a to determine a relationship D between uplink channel matrices $H_{ul}$ and downlink channel matrices $H_{dl}$. In cases where P=1 (e.g., where UE 115-a and base station 105-a stop performing the training procedure once base station 105-a determines $H_{dl1}$ and $H_{ul1}$), base station 105-a may determine D from $H_{ul1}=D \times H_{dl1}$. In cases where P>1, base station 105-a may determine D based on each uplink matrix $H_{ulp}$ and each downlink matrix $H_{dlp}$, where $1 \leq p \leq P$. For instance, base station 105-a may generate a median uplink channel matrix $H_{ul\_median}$ from the uplink matrices and a median downlink channel matrix $H_{dl\_median}$ from the downlink matrices, where $H_{ul\_median}=D \times H_{dl\_median}$. Alternatively, base station 105-a may generate an average uplink channel matrix $H_{ul\_average}$ from the uplink channel matrices and an average downlink channel matrix $H_{dl\_average}$ from the downlink channel matrices, where $H_{ul\_average}=D \times H_{dl\_average}$. Alternatively, base station 105-a may determine $\{D_p|1 \leq p \leq P\}$, where $H_{ulp}=D_p \times H_{dlp}$ and may generate a median D or an average D from $\{D_p|1 \leq p \leq P\}$.

After finishing training procedure 305-a, UE 115-a and base station 105-a may enter non-training interval 325. In non-training interval 325, UE 115-a may transmit SRS 320-c to base station 105-a. Base station 105-a, upon receiving SRS 320-c, may determine current uplink channel matrix $H_{ul\_current}$ and may use D to estimate current downlink channel matrix $H_{dl\_current}$. For instance, base station 105-a may determine $H_{dl\_current\_estimate}$ from $H_{ul\_current}=D \times H_{dl\_current\_estimate}$ Upon determining $H_{dl\_current\_estimate}$, base station 105-b may use $H_{dl\_current\_estimate}$ to aid in transmitting PDSCH 330. For instance, base station 105-a may use $H_{dl\_current\_estimate}$ to determine a precoding matrix, which base station 105-a may use to transmit PDSCH 330.

After transmitting PDSCH 330, UE 115-a and base station 105-a may perform training procedure 305-b. Training procedures 305-a and 305-b may be part of a periodic training phase pattern for partial reciprocity estimation. Training procedure 305-b may involve base station 105-a transmitting CSI-RS 310-c to UE 115-a. UE 115-a, upon receiving CSI-RS 310-c may determine $H_{dl1}$ (e.g., as described with reference to FIG. 2). UE 115-a may bundle a CSF 315-c indicating $H_{dl1}$ or one or more parameters and/or coefficients corresponding to $H_{dl1}$ with an SRS 320-d. UE 115-a may transmit the SRS 320-d bundled with the CSF 315-c to base station 105-a. Base station 105-a, upon receiving the SRS 320-d, may determine $H_{ul1}$.

Base station 105-a and UE 115-a may reperform the process of transmitting and receiving a CSI-RS 310 and SRS 320 bundled with a CSF 315 so that base station 105-a attains $H_{dl2\_updated}$ and $H_{ul2\_updated}$. In some cases, base station 105-a and UE 115-a may continue to reperform the process until base station 105-a attains $H_{dlQ}$ and $H_{ulQ}$ where Q may be the number of times the process is reperformed. At the Qth occurrence, base station 105-a may transmit CSI-RS 310-d; UE 115-a may bundle CSF 315-d with SRS 320-e; and UE 115-a may transmit CSF 315-d with SRS 320-e to base station 105-a. In some cases, Q may be equal to P. Base station 105-a may use the training procedure 305-b to determine a relationship D between uplink channel matrices $H_{ul}$ and downlink channel matrices $H_{dl}$ as described herein where P is replaced with Q.

Figure 4:
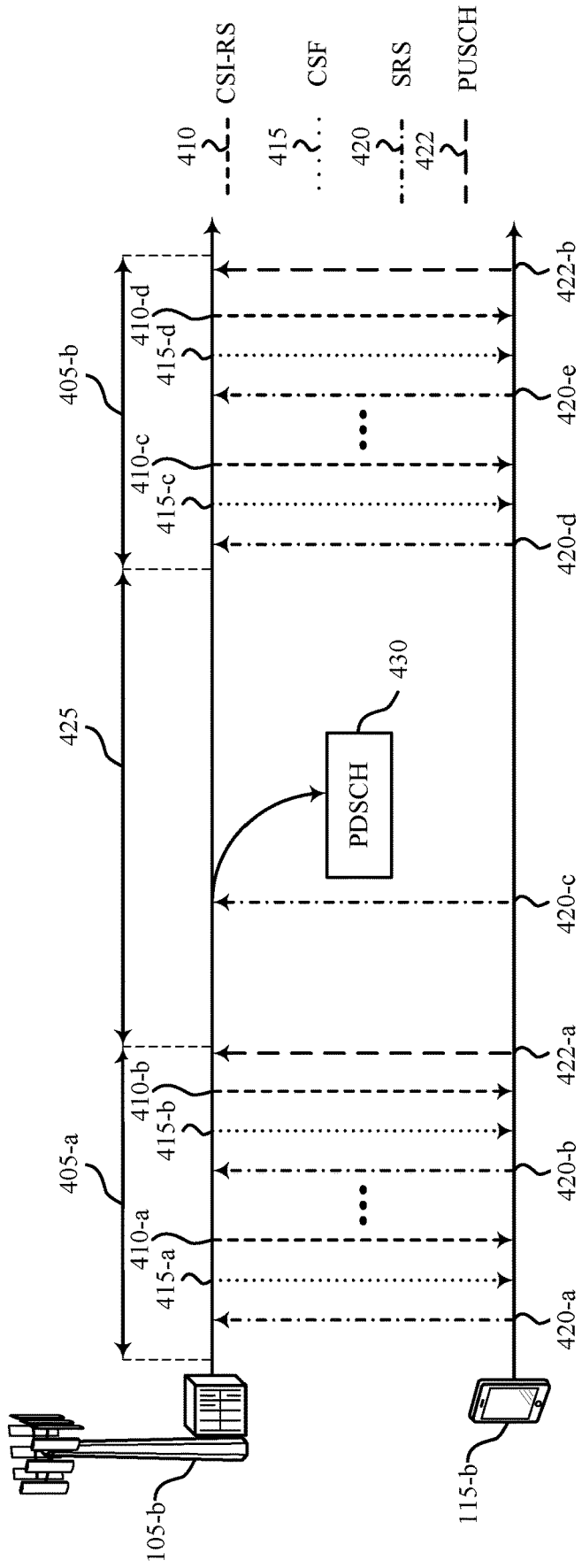
FIG. 4 illustrates an example of a communications scheme that supports coordination for partial reciprocity estimation in accordance with aspects of the present disclosure.

FIG. 4 illustrates an example of a communications scheme 400 that supports coordination for partial reciprocity estimation in accordance with aspects of the present disclosure. In some examples, communications scheme 400 may implement aspects of wireless communications system 100. For instance, base station 105-b may be an example of a base station 105 as described with reference to FIG. 1 and UE 115-b may be an example of a UE 115 as described with reference to FIG. 1.

Initially, UE 115-b and base station 105-b may perform training procedure 405-a. Training procedure 405-a may involve UE 115-b transmitting SRS 420-a to UE 115-b. Base station 105-b, upon receiving SRS 420-a may determine $H_{ul1}$ (e.g., as described with reference to FIG. 2). Base station 105-b may bundle a CSF 415-a indicating $H_{ul1}$ or one or more parameters and/or coefficients corresponding to $H_{ul1}$ with a CSI-RS 410-a. Together CSI-RS 410-a and CSF 415-a may form a (CSI-RS, CSF) pair. Base station 105-b may transmit the CSI-RS 410-a bundled with the CSF 415-a to base station 105-b. UE 115-b, upon receiving the CSI-RS 410-a, may determine $H_{dl1}$.

Base station 105-b and UE 115-b may reperform the process of transmitting and receiving an SRS 420 and a CSI-RS 410 bundled with a CSF 415 so that UE 115-b attains $H_{dl2}$ and $H_{ul2}$. In some cases, base station 105-b and UE 115-b may continue to reperform the process until base station 105-b attains $H_{dlP}$ and $H_{ulP}$ where P may be the number of times the process is reperformed. At the Pth occurrence, UE 115-b may transmit SRS 420-b; base station 105-b may bundle CSF 415-b with CSI-RS 410-b; and base station 105-b may transmit CSF 415-b with CSI-RS 410-b to UE 115-b.

UE 115-b may use the training procedure 405-a to determine a relationship D between uplink channel matrices $H_{ul}$ and downlink channel matrices $H_{dl}$. In cases where P=1 (e.g., where UE 115-b and base station 105-b stop performing the training procedure once UE 115-b determines $H_{dl1}$ and $H_{ul1}$), UE 115-b may determine D from $H_{ul1}=D \times H_{dl1}$. In cases where P>1, UE 115-b may determine D based on each uplink matrix $H_{ulp}$ and each downlink matrix $H_{dlp}$, where $1 \leq p \leq P$. For instance, UE 115-b may generate a median uplink channel matrix $H_{ul\_median}$ from the uplink matrices and a median downlink channel matrix $H_{dl\_median}$ from the downlink matrices, where $H_{ul\_median}=D \times H_{dl\_median}$. Alternatively, UE 115-b may generate an average uplink channel matrix $H_{ul\_average}$ from the uplink channel matrices and an average downlink channel matrix $H_{dl\_average}$ from the downlink channel matrices, where $H_{ul\_average}=D \times H_{dl\_average}$. Alternatively, UE 115-b may determine $\{D_p|1 \leq p \leq P\}$, where $H_{ulp}=D_p \times H_{dlp}$ and may generate a median D or an average D from $\{D_p|1 \leq p \leq P\}$. Upon determining D, UE 115-b may transmit an indication of D to base station 105-b. The indication may be conveyed via PUSCH signaling 422-a.

After finishing training procedure 405-a, UE 115-b and base station 105-b may enter non-training interval 425. In non-training interval 425, UE 115-b may transmit SRS 420-c to base station 105-b. Base station 105-b, upon receiving SRS 420-c, may determine current uplink channel matrix $H_{ul\_current}$ and may use D to estimate current downlink channel matrix $H_{dl\_current}$. For instance, base station 105-b may determine $H_{dl\_current\_estimate}$ from $H_{ul\_current}=D \times H_{dl\_current\_estimate}$.

Upon determining $H_{dl\_current\_estimate}$, base station 105-b may use $H_{dl\_current\_estimate}$ to aid in transmitting PDSCH 430. For instance, base station 105-b may use $H_{dl\_current\_estimate}$ to determine a precoding matrix, which base station 105-b may use to transmit PDSCH 430.

After transmitting PDSCH 430, UE 115-b and base station 105-b may perform training procedure 405-b. Training procedures 405-*a* and 405-*b* may be part of a periodic training phase pattern for partial reciprocity estimation. Training procedure 405-*b* may involve UE 115-*b* transmitting SRS 420-*d* to UE 115-*b*. Base station 105-*b*, upon receiving SRS 420-*d* may determine $H_{ul1}$ (e.g., as described with reference to FIG. 2). Base station 105-*b* may bundle a CSF 415-*c* indicating $H_{ul1}$ or one or more parameters and/or coefficients corresponding to $H_{ul1}$ with a CSI-RS 410-*c*. Base station 105-*b* may transmit the CSI-RS 410-*c* bundled with the CSF 415-*c* to base station 105-*b*. UE 115-*b*, upon receiving the CSI-RS 410-*c*, may determine $H_{dl1}$.

Base station 105-*b* and UE 115-*b* may reperform the process of transmitting and receiving an SRS 420 and a CSI-RS 410 bundled with a CSF 415 so that UE 115-*b* attains $H_{dl2}$ and $H_{ul2}$. In some cases, base station 105-*b* and UE 115-*b* may continue to reperform the process until base station 105-*b* attains $H_{dlQ}$ and $H_{ulQ}$ where Q may be the number of times the process is reperformed. At the Qth occurrence, UE 115-*b* may transmit SRS 420-*e*; base station 105-*b* may bundle CSF 415-*d* with CSI-RS 410-*d*; and base station 105-*b* may transmit CSF 415-*d* with CSI-RS 410-*d* to UE 115-*b*. In some cases, Q may be equal to P. UE 115-*b* may use the training procedure 405-*b* to determine a relationship D between uplink channel matrices $H_{ul}$ and downlink channel matrices $H_{dl}$ as described herein where P is replaced with Q. UE 115-*b* may transmit an indication of D to base station 105-*b* (e.g., via PUSCH signaling 422-*b*).

Figure 5:
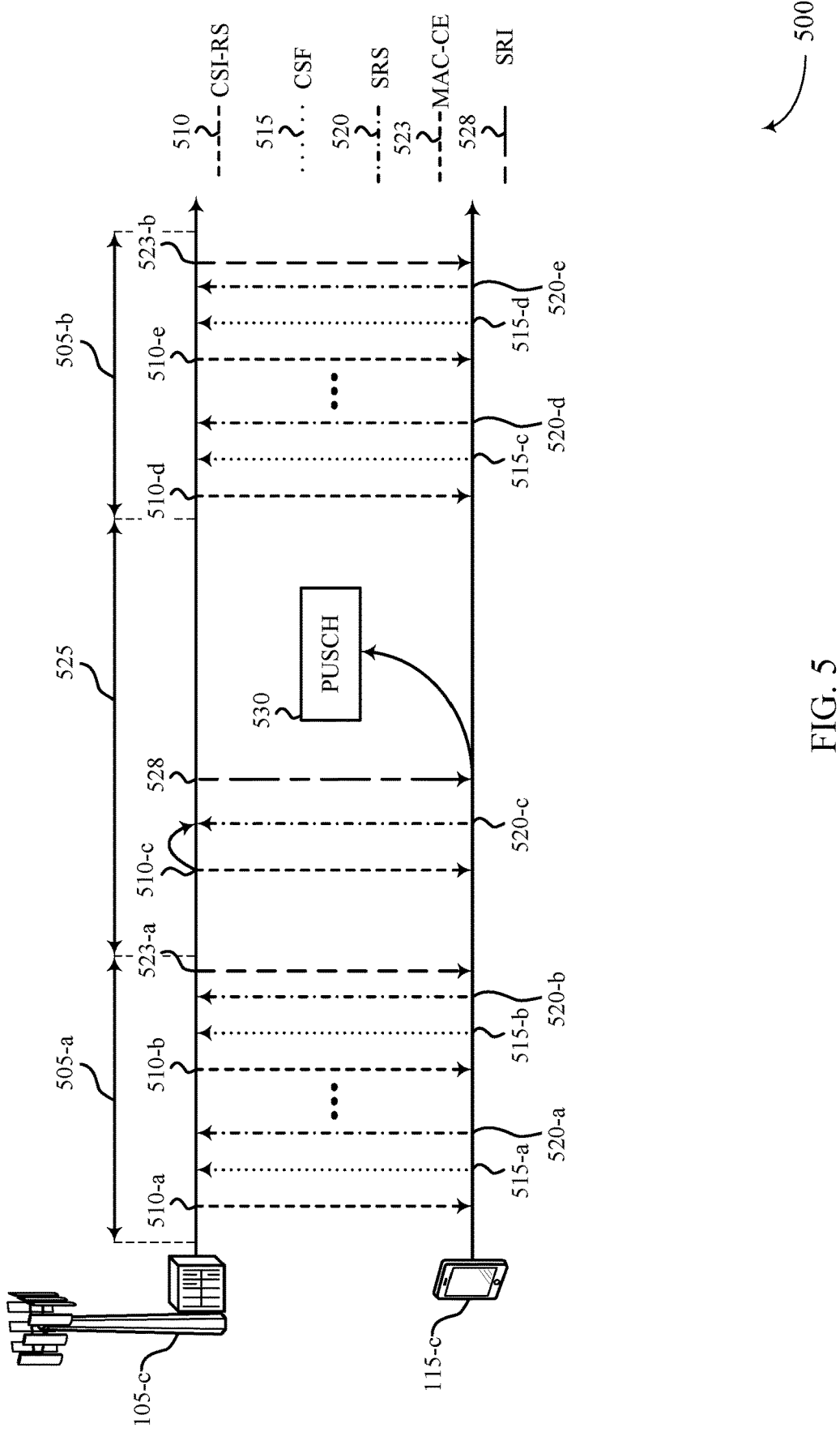
FIG. 5 illustrates an example of a communications scheme that supports coordination for partial reciprocity estimation in accordance with aspects of the present disclosure.

FIG. 5 illustrates an example of a communications scheme 500 that supports coordination for partial reciprocity estimation in accordance with aspects of the present disclosure. In some examples, communications scheme 500 may implement aspects of wireless communications system 100. For instance, base station 105-*c* may be an example of a base station 105 as described with reference to FIG. 1 and UE 115-*c* may be an example of a UE 115 as described with reference to FIG. 1.

Initially, UE 115-*c* and base station 105-*b* may perform training procedure 505-*a*. Training procedure 505-*a* may involve base station 105-*b* transmitting CSI-RS 510-*a* to UE 115-*c*. UE 115-*c*, upon receiving CSI-RS 510-*a* may determine $H_{dl1}$ (e.g., as described with reference to FIG. 2). UE 115-*c* may bundle a CSF 515-*a* indicating $H_{dl1}$ or one or more parameters and/or coefficients corresponding to $H_{dl1}$ with an SRS 520-*a*. Together CSF 515-*a* and SRS 520-*a* may form a (CSF, SRS) pair. UE 115-*c* may transmit the SRS 520-*a* bundled with the CSF 515-*a* to base station 105-*b*. Base station 105-*b*, upon receiving the SRS 520-*a*, may determine $H_{ul1}$.

Base station 105-*b* and UE 115-*c* may reperform the process of transmitting and receiving a CSI-RS 510 and SRS 520 bundled with a CSF 515 so that base station 105-*b* attains $H_{dl2}$ and $H_{ul2}$. In some cases, base station 105-*b* and UE 115-*c* may continue to reperform the process until base station 105-*b* attains $H_{dlp}$ and $H_{ul1}$) where P may be the number of times the process is reperformed. At the Pth occurrence, base station 105-*b* may transmit CSI-RS 510-*b*; UE 115-*c* may bundle CSF 515-*b* with SRS 520-*b*; and UE 115-*c* may transmit CSF 515-*b* with SRS 520-*b* to base station 105-*b*.

Base station 105-*b* may use the training procedure 505-*a* to determine a relationship D between uplink channel matrices $H_{ul}$ and downlink channel matrices $H_{dl}$. In cases where P=1 (e.g., where UE 115-*c* and base station 105-*b* stop performing the training procedure once base station 105-*b* determines $H_{dl1}$ and $H_{ul1}$), base station 105-*b* may determine D from $H_{ul1}=D \times H_{dl1}$. In cases where P>1, base station 105-*b* may determine D based on each uplink matrix $H_{ulp}$ and each downlink matrix $H_{dlp}$, where 1≤p≤P. For instance, base station 105-*b* may generate a median uplink channel matrix $H_{ul\_median}$ from the uplink matrices and a median downlink channel matrix $H_{dl\_median}$ from the downlink matrices, where $H_{ul\_median}=D \times H_{dl\_median}$. Alternatively, base station 105-*b* may generate an average uplink channel matrix $H_{ul\_average}$ from the uplink channel matrices and an average downlink channel matrix $H_{dl\_average}$ from the downlink channel matrices, where $H_{ul\_average}=D \times H_{dl\_average}$. Alternatively, base station 105-*b* may determine $\{D_p | 1 \leq p \leq P\}$, where $H_{ulp}=D_p \times H_{dlp}$ and may generate a median D or an average D from $\{D_p | 1 \leq p \leq P\}$. Upon determining D, base station 105-*c* may transmit an indication of D to UE 115-*c*. The indication may be conveyed via MAC-CE 523-*a*.

After finishing training procedure 505-*a*, UE 115-*c* and base station 105-*c* may enter non-training interval 525. In non-training interval 525, base station 105-*c* may transmit CSI-RS 510-*c* to UE 115-*c*. UE 115-*c*, upon receiving CSI-RS 510-*c*, may determine current downlink channel matrix $H_{dl\_current}$ and may use D to estimate current downlink channel matrix $H_{dl\_current}$ For instance, base station 105-*c* may determine $H_{ul\_current\_estimate}$ from $H_{ul\_current\_estimate}=D \times H_{dl\_current}$. UE 115-*c* may use $H_{ul\_current\_estimate}$ to performing precoding on SRS 520-*c*. UE 115-*c* may transmit the precoded SRS 520-*c* to base station 105-*c*, which may transmit a scheduling request indicator (SRI) 528 to UE 115-*c* in turn. The SRI 528 may be included with downlink control information (DCI). Using the SRI 528, UE 115-*c* may transmit PUSCH 530 to base station 105-*c*.

After transmitting PUSCH 530, UE 115-*c* and base station 105-*c* may perform training procedure 505-*b*. Training procedures 505-*a* and 505-*b* may be part of a periodic training phase pattern for partial reciprocity estimation. Training procedure 505-*b* may involve base station 105-*c* transmitting CSI-RS 510-*d* to UE 115-*c*. UE 115-*c*, upon receiving CSI-RS 510-*d* may determine $H_{dl1}$ (e.g., as described with reference to FIG. 2). UE 115-*c* may bundle a CSF 515-*c* indicating $H_{dl1}$ or one or more parameters and/or coefficients corresponding to $H_{dl1}$ with an SRS 520-*d*. Together CSI-RS 610-*a* and CSF 615-*a* may form a (CSI-RS, CSF) pair. UE 115-*c* may transmit the SRS 520-*d* bundled with the CSF 515-*c* to base station 105-*c*. Base station 105-*c*, upon receiving the SRS 520-*d*, may determine $H_{ul1}$.

Base station 105-*c* and UE 115-*c* may reperform the process of transmitting and receiving a CSI-RS 510 and SRS 520 bundled with a CSF 515 so that base station 105-*c* attains $H_{dl2\_updated}$ and $H_{ul2\_updated}$. In some cases, base station 105-*c* and UE 115-*c* may continue to reperform the process until base station 105-*c* attains $H_{dlQ}$ and $H_{ulQ}$ where Q may be the number of times the process is reperformed. At the Qth occurrence, base station 105-*c* may transmit CSI-RS 510-*e*; UE 115-*c* may bundle CSF 515-*d* with SRS 520-*e*; and UE 115-*c* may transmit CSF 515-*d* with SRS 520-*e* to base station 105-*c*. In some cases, Q may be equal to P. Base station 105-*c* may use the training procedure 505-*b* to determine a relationship D between uplink channel matrices $H_{ul}$ and downlink channel matrices $H_{dl}$ as described herein where P is replaced with Q. Upon updating D, base station 105-*c* may transmit an indication of D to UE 115-*c*. The indication may be conveyed via MAC-CE 523-*b*.

Figure 6:
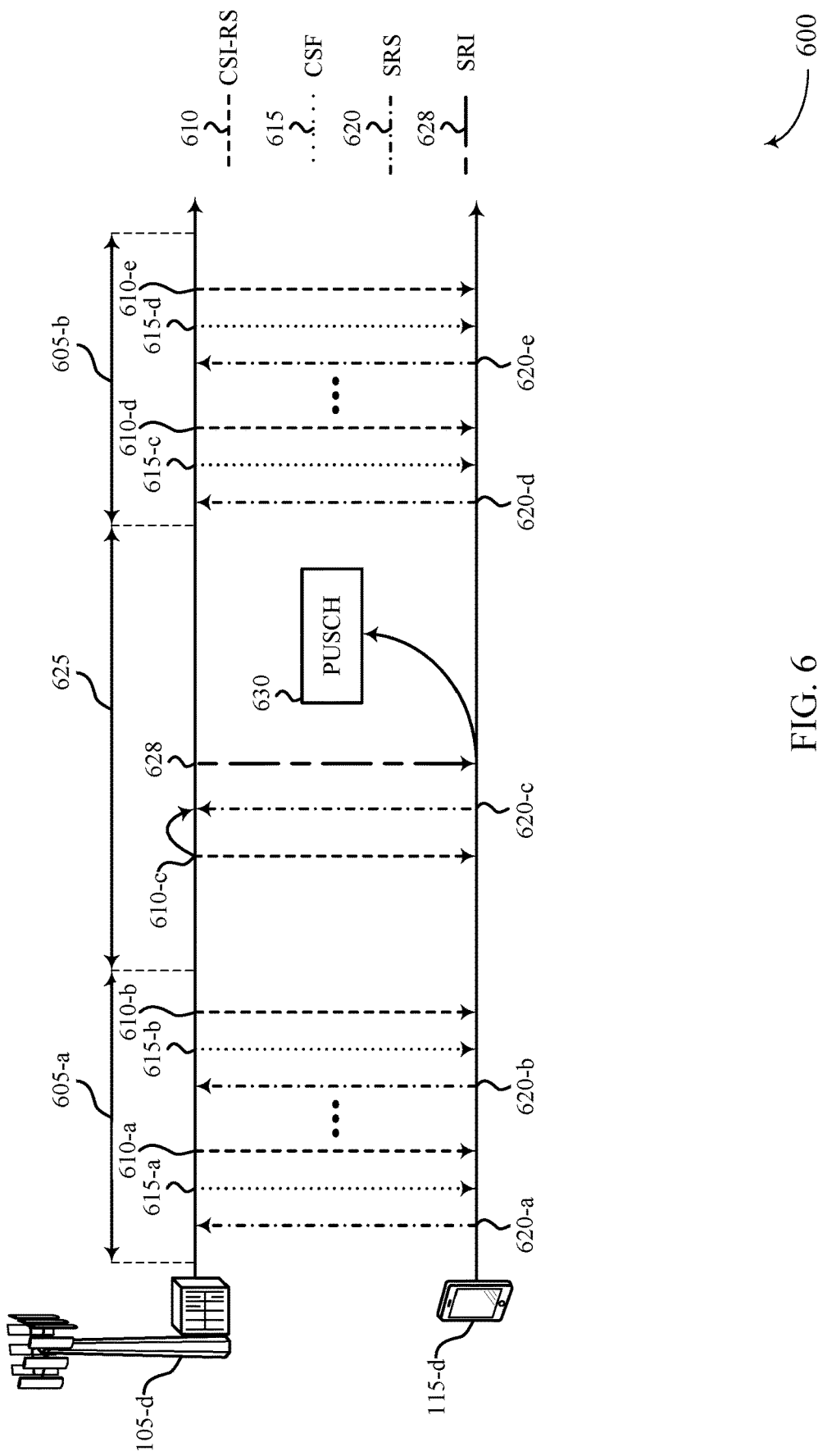
FIG. 6 illustrates an example of a communications scheme that supports coordination for partial reciprocity estimation in accordance with aspects of the present disclosure.

FIG. 6 illustrates an example of a communications scheme 600 that supports coordination for partial reciprocity estimation in accordance with aspects of the present disclosure. In some examples, communications scheme 600 may implement aspects of wireless communications system 100. For instance, base station 105-*d* may be an example of a base station 105 as described with reference to FIG. 1 and UE 115-d may be an example of a UE 115 as described with reference to FIG. 1.

Initially, UE 115-d and base station 105-d may perform training procedure 605-a. Training procedure 605-a may involve UE 115-d transmitting SRS 620-a to UE 115-d. Base station 105-d, upon receiving SRS 620-a may determine $H_{ul1}$ (e.g., as described with reference to FIG. 2). Base station 105-d may bundle a CSF 615-a indicating $H_{ul1}$ or one or more parameters and/or coefficients corresponding to $H_{ul1}$ with a CSI-RS 610-a. Base station 105-d may transmit the CSI-RS 610-a bundled with the CSF 615-a to base station 105-d. UE 115-d, upon receiving the CSI-RS 610-a, may determine $H_{dl1}$.

Base station 105-d and UE 115-d may reperform the process of transmitting and receiving an SRS 620 and a CSI-RS 610 bundled with a CSF 615 so that UE 115-d attains $H_{dl2}$ and $H_{ul2}$. In some cases, base station 105-d and UE 115-d may continue to reperform the process until base station 105-d attains $H_{dlp}$ and $H_{ul1}$, where P may be the number of times the process is reperformed. At the Pth occurrence, UE 115-d may transmit SRS 620-b; base station 105-d may bundle CSF 615-b with CSI-RS 610-b; and base station 105-d may transmit CSF 615-b with CSI-RS 610-b to UE 115-d.

UE 115-d may use the training procedure 605-a to determine a relationship D between uplink channel matrices $H_{ul}$ and downlink channel matrices $H_{dl}$. In cases where P=1 (e.g., where UE 115-d and base station 105-d stop performing the training procedure once UE 115-d determines $H_{dl1}$ and $H_{ul1}$), UE 115-d may determine D from $H_{ul1} = D \times H_{dli}$. In cases where P>1, UE 115-d may determine D based on each uplink matrix $H_{ulp}$ and each downlink matrix $H_{dlp}$, where 1≤p≤P. For instance, UE 115-d may generate a median uplink channel matrix $H_{ul\_median}$ from the uplink matrices and a median downlink channel matrix $H_{dl\_median}$ from the downlink matrices, where $H_{ul\_median} = D \times H_{dl\_median}$. Alternatively, UE 115-d may generate an average uplink channel matrix $H_{ul\_average}$ from the uplink channel matrices and an average downlink channel matrix $H_{dl\_average}$ from the downlink channel matrices, where $H_{ul\_average} = D \times H_{dl\_average}$. Alternatively, UE 115-d may determine $\{D_p | 1 \leq p \leq P\}$, where $H_{ulp} = D_p \times H_{dlp}$ and may generate a median D or an average D from $\{D_p | 1 \leq p \leq P\}$.

After finishing training procedure 605-a, UE 115-d and base station 105-d may enter non-training interval 625. In non-training interval 625, base station 105-d may transmit CSI-RS 610-c to UE 115-d. UE 115-d, upon receiving CSI-RS 610-c, may determine current downlink channel matrix $H_{dl\_current}$ and may use D to estimate current downlink channel matrix $H_{dl\_current}$. For instance, base station 105-d may determine $H_{ul\_current\_estimate}$ from $H_{ul\_current\_estimate} = D \times H_{dl\_current}$. UE 115-d may use $H_{ul\_current\_estimate}$ to performing precoding on SRS 620-c. UE 115-d may transmit the precoded SRS 620-c to base station 105-d, which may transmit a scheduling request indicator (SRI) 628 to UE 115-d in turn. The SRI 628 may be included with DCI. Using the SRI 628, UE 115-d may transmit PUSCH 630 to base station 105-d.

After transmitting PUSCH 630, UE 115-d and base station 105-d may perform training procedure 405-b. Training procedures 605-a and 605-b may be part of a periodic training phase pattern for partial reciprocity estimation. Training procedure 605-b may involve UE 115-d transmitting SRS 620-d to UE 115-d. Base station 105-d, upon receiving SRS 620-d may determine $H_{ul1}$ (e.g., as described with reference to FIG. 2). Base station 105-d may bundle a CSF 615-c indicating $H_{ul1}$ or one or more parameters and/or coefficients corresponding to $H_{ul1}$ with a CSI-RS 610-c. Base station 105-d may transmit the CSI-RS 610-c bundled with the CSF 615-c to base station 105-d. UE 115-d, upon receiving the CSI-RS 610-c, may determine $H_{dl1}$.

Base station 105-d and UE 115-d may reperform the process of transmitting and receiving an SRS 620 and a CSI-RS 610 bundled with a CSF 615 so that UE 115-d attains $H_{dl2}$ and $H_{ul2}$. In some cases, base station 105-d and UE 115-d may continue to reperform the process until base station 105-d attains $H_{dlQ}$ and $H_{ulQ}$ where Q may be the number of times the process is reperformed. At the Qth occurrence, UE 115-d may transmit SRS 620-e; base station 105-d may bundle CSF 615-d with CSI-RS 610-e; and base station 105-d may transmit CSF 615-d with CSI-RS 610-e to UE 115-d. In some cases, Q may be equal to P. UE 115-d may use the training procedure 605-b to determine a relationship D between uplink channel matrices $H_{ul}$ and downlink channel matrices $H_{dl}$ as described herein where P is replaced with Q.

Figure 7:
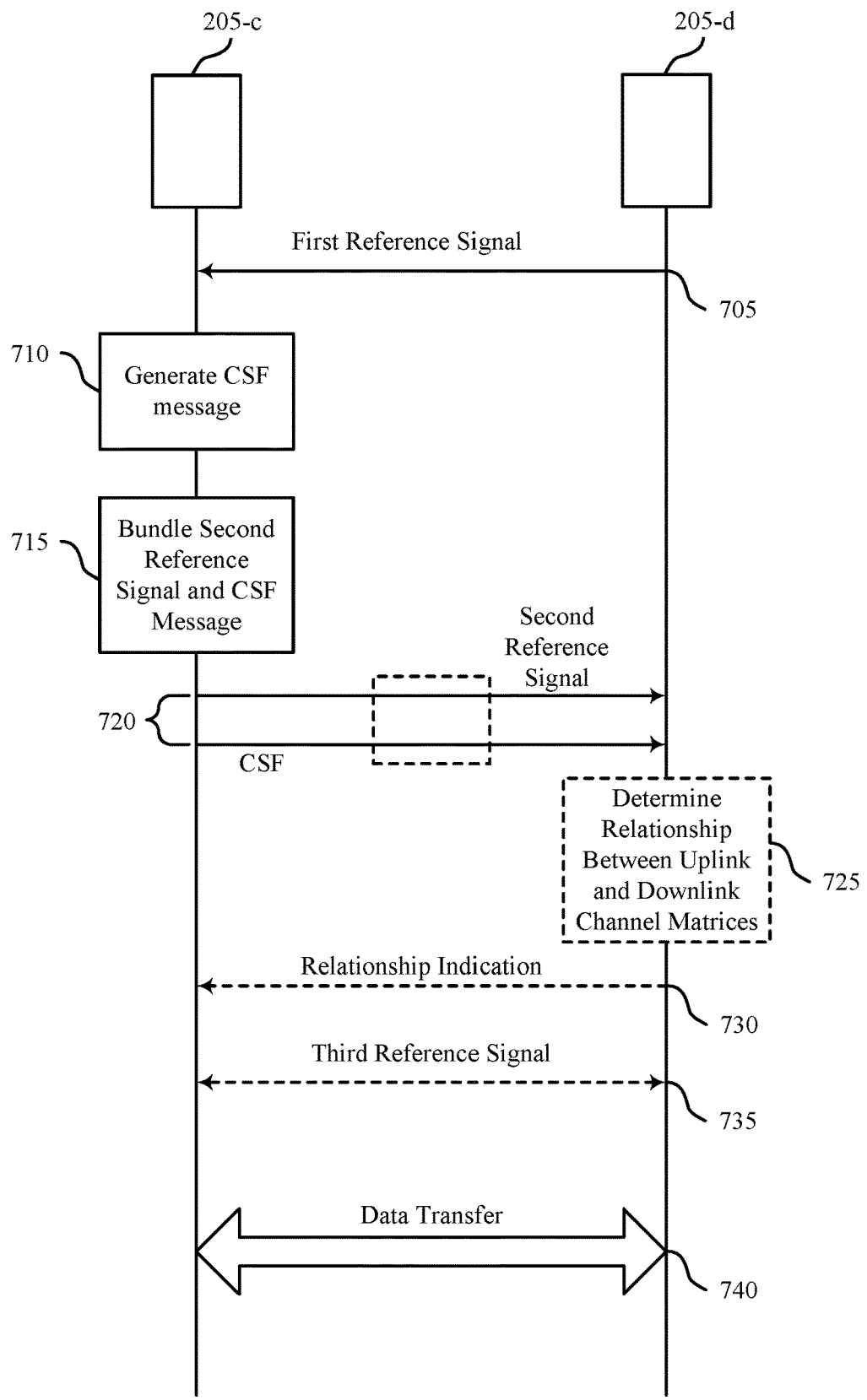
FIG. 7 illustrates an example of a process flow that supports coordination for partial reciprocity estimation in accordance with aspects of the present disclosure.

FIG. 7 illustrates an example of a process flow 700 that supports coordination for partial reciprocity estimation in accordance with aspects of the present disclosure. In some examples, process flow 700 may implement aspects of wireless communications systems 100 and 200. For instance, process flow 700 may be implemented by wireless devices 205-c and 205-d, which may be examples of wireless devices 205 as described with reference to FIG. 2. Wireless device 205-c and 205-d may each be one of a UE 115 or a base station 105.

At 705, wireless device 205-d may transmit a first reference signal. Wireless device 205-c may receive the first reference signal.

At 710, wireless device 205-c may generate a CSF message based on the first reference signal. For instance, wireless device 205-c may determine a channel matrix $H_1$ based on the first reference signal and may provide an indication of $H_1$ or of coefficients and/or parameters usable to construct or recover $H_1$ in the CSF. If wireless device 205-c is a UE 115 and wireless device 205-d is a base station 105, $H_1$ may be a downlink channel matrix. If wireless device 205-c is a base station 105 and wireless device 205-d is a UE 115, $H_1$ may be an uplink channel matrix.

At 715, wireless device 205-c may bundle a second reference signal and the second CSF message.

At 720, wireless device 205-c may transmit the second reference signal and the CSF message. Wireless device 205-d may receive the second reference signal and the CSF message. Wireless device, based on receiving the second reference signal, may determine a channel matrix $H_2$. If wireless device 205-c is a UE 115 and wireless device 205-d is a base station 105, $H_2$ may be an uplink channel matrix. If wireless device 205-c is a base station 105 and wireless device 205-d is a UE 115, $H_2$ may be a downlink channel matrix.

At 725, wireless device 205-d may determine a relationship between an uplink channel matrix and a downlink channel matrix (e.g., D as described herein). At 730, wireless device 205-d may transmit signaling indicating the relationship between the uplink channel matrix and the downlink channel matrix. The signaling may be MAC-CE signaling or PUSCH signaling.

At 735, wireless device 205-c or wireless device 205-d may transmit a third reference signal. Wireless device 205-d or wireless device 205-c, respectively, may receive the third reference signal. The wireless device 205 that receives the third reference signal may determine a current channel matrix based on the third reference signal (e.g., $H_{1\_new}$ if wireless device 205-c receives the third reference signal and $H_{2\_new}$ if wireless device 205-d receives the third reference signal) and may use the current channel matrix and the relationship between the uplink channel matrix and the downlink channel matrix to estimate another channel matrix (e.g., $H_{2\_new\_estimate}$ in the former case and $H_{1\_new\_estimate}$).

In some cases, the wireless device 205 that receives the third reference signal may transmit a fourth reference signal to the other wireless device 205. In such cases, the third reference signal may be a CSI-RS and the fourth reference signal may be an SRS. The fourth reference signal may be precoded based on the third reference signal. In some cases, the other wireless device 205, upon receiving the fourth reference signal, may transmit an SRI to the wireless device 205 that transmitted the fourth reference signal.

At 740, wireless devices 205-c and 205-d may initiate data transfer. If wireless device 205-c received the third reference signal, wireless device 205-c may transmit a shared channel transmission to wireless device 205-d. Alternatively, if wireless device 205-d received the third reference signal, wireless device 205-d may transmit a shared channel transmission to wireless device 205-c.

Figure 8:
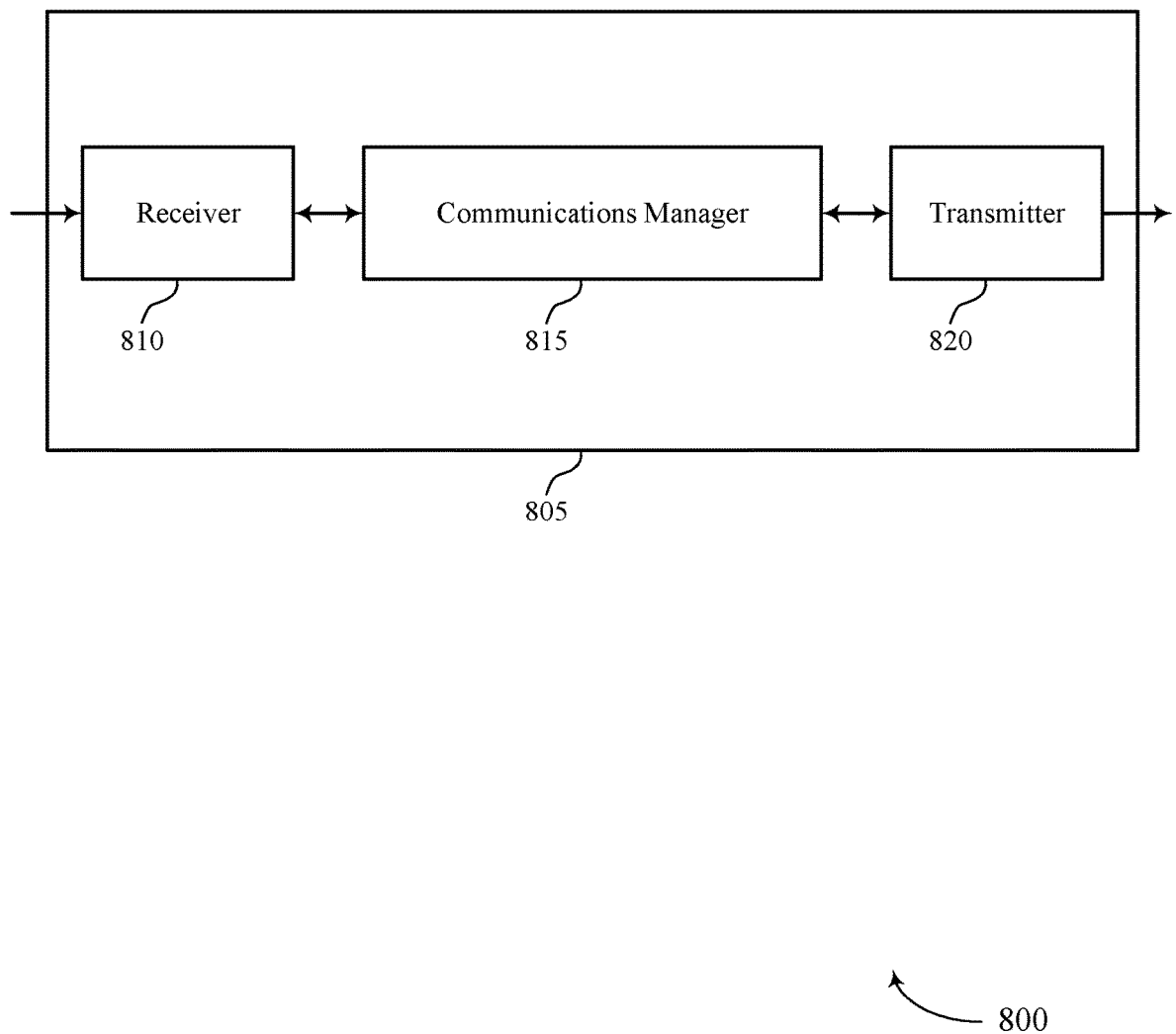
FIGS. 8 and 9 show block diagrams of devices that support coordination for partial reciprocity estimation in accordance with aspects of the present disclosure.

FIG. 8 shows a block diagram 800 of a device 805 that supports coordination for partial reciprocity estimation in accordance with aspects of the present disclosure. The device 805 may be an example of aspects of a UE 115, a base station 105, or a wireless device 205 as described herein. The device 805 may include a receiver 810, a communications manager 815, and a transmitter 820. The device 805 may also include a processor. Each of these components may be in communication with one another (e.g., via one or more buses). The device may include one or more processors, memory coupled with the one or more processors, and instructions stored in the memory that are executable by the one or more processors to enable the one or more processors to perform the communications features discussed herein Receiver 810 may receive information such as packets, user data, or control information associated with various information channels (e.g., control channels, data channels, and information related to coordination for partial reciprocity estimation, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may receive a first reference signal from a second device, transmit the second reference signal and the channel status feedback message to the second device, generate a channel status feedback message based on the first reference signal, bundle a second reference signal and the channel status feedback message, and initiate a data transfer with the second device based on transmitting the second reference signal and the channel status feedback message. The communications manager 815 may also transmit a first reference signal to a second device, receive a second reference signal bundled with a channel status feedback message from the second device based on transmitting the first reference signal, and initiate data transfer with the second device based on receiving the second reference signal bundled with the channel status feedback message. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages. One implementation may allow a wireless device to provide improved quality and reliability of service due to more accurately determining the channel matrix for the channel for transmitting the shared channel transmission.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
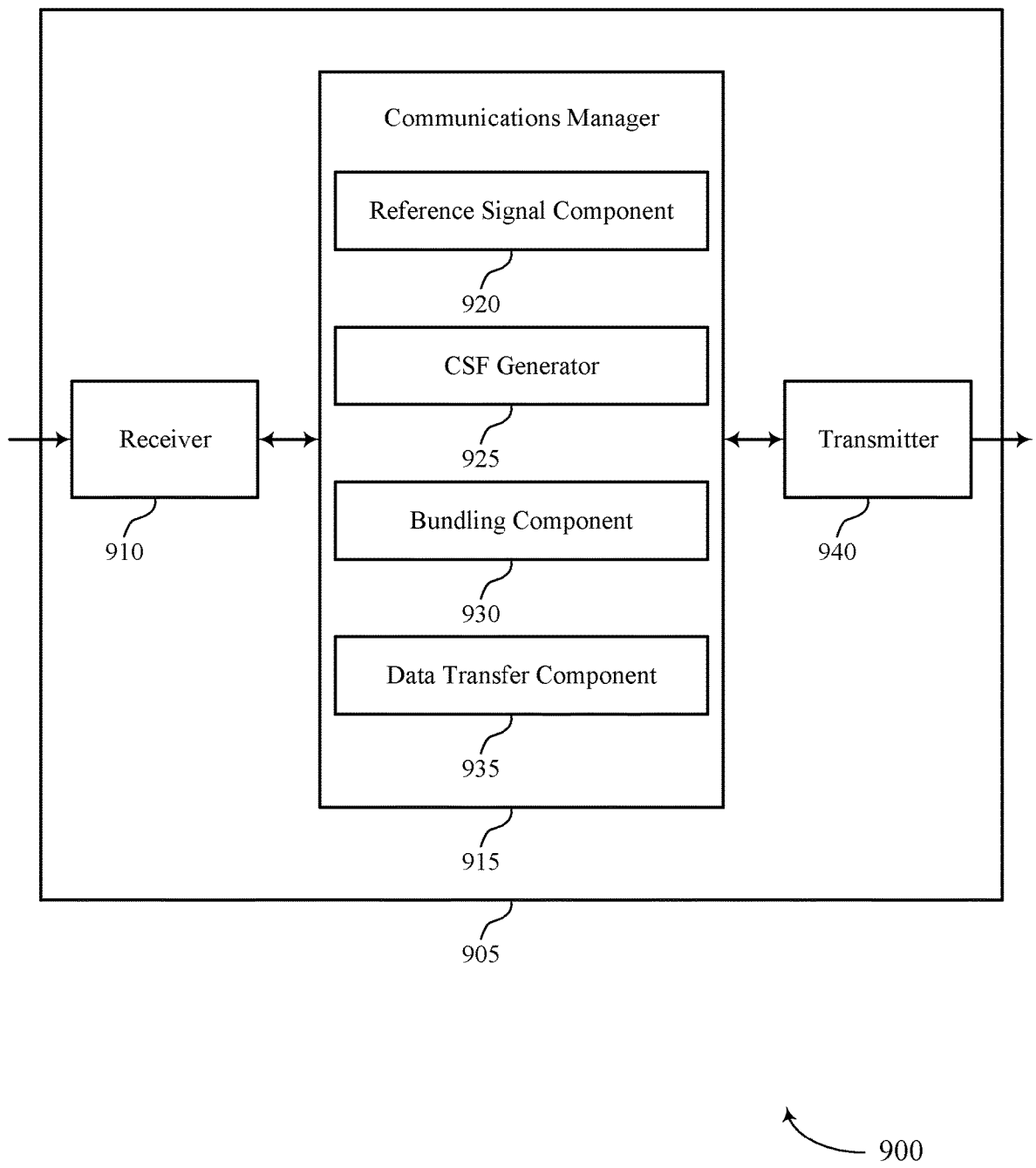

FIG. 9 shows a block diagram 900 of a device 905 that supports coordination for partial reciprocity estimation in accordance with aspects of the present disclosure. The device 905 may be an example of aspects of a device 805, a UE 115, a base station 105, or a wireless device 205 as described herein. The device 905 may include a receiver 910, a communications manager 915, and a transmitter 940. The device 905 may also include a processor. Each of these components may be in communication with one another (e.g., via one or more buses).

Receiver 910 may receive information such as packets, user data, or control information associated with various information channels (e.g., control channels, data channels, and information related to coordination for partial reciprocity estimation, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a reference signal component 920, a CSF generator 925, a bundling component 930, and a data transfer component 935. The communications manager 915 may be an example of aspects of the communications manager 1110 or 1210 as described herein. In some cases, the communications manager 915 may enable the device to more effectively receive or transmit shared channel transmissions by performing methods that account for channel conditions.

The reference signal component 920 may receive a first reference signal from a second device and transmit a second reference signal and a channel status feedback message to the second device. The reference signal component 920 may transmit a first reference signal to a second device and receive a second reference signal bundled with a channel status feedback message from the second device based on transmitting the first reference signal. In some cases, the reference signal component 920 may be a processor (e.g., a transceiver processor, a radio processor, or a receiver processor). The processor may be coupled with memory and execute instructions stored in the memory that enable the processor to perform or facilitate reception and transmission of reference signals as discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

The CSF generator 925 may generate the channel status feedback message based on the first reference signal. In some cases, the CSF generator 925 may be a processor. The processor may be coupled with memory and execute instructions stored in the memory that enable the processor to perform or facilitate CSF generation features discussed herein.

The bundling component 930 may bundle the second reference signal and the channel status feedback message. In some cases, the bundling component 930 may be a processor. The processor may be coupled with memory and execute instructions stored in the memory that enable the processor to perform or facilitate reference signal CSF bundling described herein.

The data transfer component 935 may initiate a data transfer with the second device based on transmitting the second reference signal and the channel status feedback message. The data transfer component 935 may initiate data transfer with the second device based on receiving the second reference signal bundled with the channel status feedback message. In some cases, the data transfer component 935 may be a processor (e.g., a transceiver processor, a radio processor, or a receiver processor). The processor may be coupled with memory and execute instructions stored in the memory that enable the processor to perform or facilitate shared channel transmission or reception described herein.

Transmitter 940 may transmit signals generated by other components of the device 905. In some examples, the transmitter 940 may be collocated with a receiver 910 in a transceiver module. For example, the transmitter 940 may be an example of aspects of the transceiver 1120 or 1220 as described with reference to FIGS. 11 and 12. The transmitter 940 may utilize a single antenna or a set of antennas.

Figure 10:
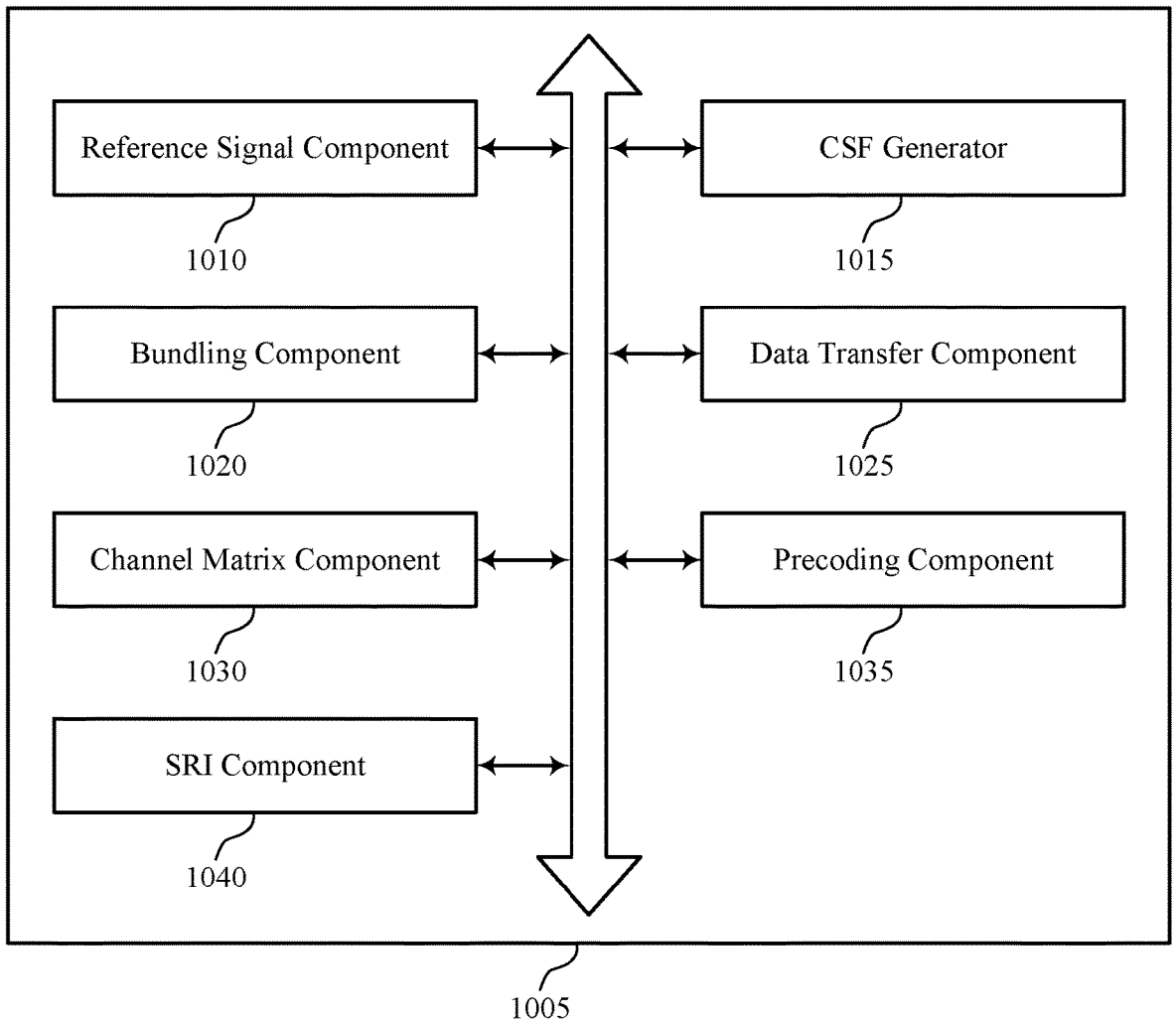
FIG. 10 shows a block diagram of a communications manager that supports coordination for partial reciprocity estimation in accordance with aspects of the present disclosure.

FIG. 10 shows a block diagram 1000 of a communications manager 1005 that supports coordination for partial reciprocity estimation in accordance with aspects of the present disclosure. The communications manager 1005 may be an example of aspects of a communications manager 815, a communications manager 915, or a communications manager 1110 described herein. The communications manager 1005 may include a reference signal component 1010, a CSF generator 1015, a bundling component 1020, a data transfer component 1025, a channel matrix component 1030, a precoding component 1035, and a SRI component 1040. Each of these modules may communicate, directly or indirectly, with one another (e.g., via one or more buses).

The reference signal component 1010 may receive a first reference signal from a second device. The first reference signal may be received as part of a first training procedure. In some examples, the reference signal component 1010 may transmit a second reference signal and a channel status feedback message to the second device. The second reference signal and the channel status feedback message may be transmitted as part of the first training procedure. In some examples, the reference signal component 1010 may transmit a first reference signal to a second device. The first reference signal may be transmitted as part of the first training procedure. In some examples, the reference signal component 1010 may receive a second reference signal bundled with a channel status feedback message from the second device based on transmitting the first reference signal. The second reference signal bundled with the channel status feedback message may be received as part of the first training procedure.

In some examples, the reference signal component 1010 may receive a third reference signal after transmitting the channel status feedback message. In some examples, the reference signal component 1010 may transmit a fourth reference signal to the second device, where the fourth reference signal is precoded based on receiving the third reference signal. In some examples, the reference signal component 1010 may transmit a third reference signal. In some examples, the reference signal component 1010 may receive a fourth reference signal, where the third reference signal is based on transmitting the third reference signal and the channel status feedback message. In some examples, the reference signal component 1010 may receive a third reference signal from the second device as part of a second training procedure.

In some examples, the reference signal component 1010 may transmit the fourth reference signal and the second channel status feedback message to the second device as part of the second training procedure. In some examples, the reference signal component 1010 may transmit a set of reference signals including the second reference signal and a set of channel status feedback messages including the channel status feedback message as part of the training procedure, where each reference signal of the set of reference signals is bundled with a corresponding channel status feedback message of the set of channel status feedback messages, and where initiating the data transfer is based on transmitting the set of reference signals and the set of channel status feedback messages. In some examples, the reference signal component 1010 may transmit a third reference signal after receiving the channel status feedback message from the second device. In some examples, the reference signal component 1010 may receive a fourth reference signal, where the fourth reference signal is based on transmitting the third reference signal and receiving the channel status feedback message.

In some examples, the reference signal component 1010 may receive a third reference signal after receiving the channel status feedback message from the second device. In some examples, the reference signal component 1010 may transmit a fourth reference signal to the second device, where the fourth reference signal is precoded based on receiving the third reference signal. In some examples, the reference signal component 1010 may third reference signal is a channel state information reference signal. In some examples, the reference signal component 1010 may transmit a third reference signal to the second device as part of the second training procedure. In some examples, the reference signal component 1010 may receive a fourth reference signal bundled with a second channel status feedback message from the second device based on transmitting the third reference signal as part of the second training procedure.

In some examples, the reference signal component 1010 may receive a set of reference signals including the second reference signal and a set of channel status feedback messages including the channel status feedback message as part of the training procedure, where each reference signal of the set of reference signals is bundled with a corresponding channel status feedback message of the set of channel status feedback messages, and where initiating the data transfer is based on receiving the set of reference signals and the set of channel status feedback messages. In some cases, the third reference signal is a channel state information reference signal. In some cases, the fourth reference signal is a sounding reference signal. In some cases, the third reference signal is a sounding reference signal. In some cases, the third reference signal is a sounding reference signal, and where the shared channel transmission is a downlink shared channel transmission. In some cases, the third reference signal is a channel state information reference signal, and where the shared channel transmission is an uplink shared channel transmission.

In some cases, the first reference signal includes a sounding reference signal, the second reference signal includes a channel state information reference signal, the first device is a base station, and the second device is a UE. In some cases, the first reference signal includes a channel state information reference signal, the second reference signal includes a sounding reference signal, the first device is a UE, and the second device is a base station. In some cases, the fourth reference signal is a sounding reference signal. In some cases, the third reference signal is a sounding reference signal, and where the shared channel transmission is a downlink shared channel transmission. In some cases, the third reference signal is a channel state information reference signal, and where the shared channel transmission is an uplink shared channel transmission. In some cases, the third reference signal is a sounding reference signal. In some cases, the first reference signal includes a sounding reference signal, the second reference signal includes a channel state information reference signal, the first device is a UE, and the second device is a base station. In some cases, the first reference signal includes a channel state information reference signal, the second reference signal includes a sounding reference signal, the first device is a base station, and the second device is a UE.

In some cases, the reference signal component 1010 may be a processor (e.g., a transceiver processor, a radio processor, or a receiver processor). The processor may be coupled with memory and execute instructions stored in the memory that enable the processor to perform or facilitate reception and transmission of reference signals as discussed herein.

The CSF generator 1015 may generate the channel status feedback message based on the first reference signal. Generating the channel status feedback message may be part of the first training procedure. In some examples, the CSF generator 1015 may generate a second channel status feedback message based on receiving the third reference signal as part of the second training procedure. In some cases, the CSF generator 1015 may be a processor. The processor may be coupled with memory and execute instructions stored in the memory that enable the processor to perform or facilitate CSF generation features discussed herein.

The bundling component 1020 may bundle a second reference signal and the channel status feedback message. In some examples, the bundling component 1020 may bundle a fourth reference signal and the second channel status feedback message as part of the second training procedure. In some cases, the bundling component 1020 may be a processor. The processor may be coupled with memory and execute instructions stored in the memory that enable the processor to perform or facilitate reference signal CSF bundling described herein.

The data transfer component 1025 may initiate a data transfer with the second device based on transmitting the second reference signal and the channel status feedback message. In some examples, the data transfer component 1025 may initiate data transfer with the second device based on receiving the second reference signal bundled with the channel status feedback message. In some examples, the data transfer component 1025 may transmit a shared channel transmission as part of the data transfer based on receiving the third reference signal and the channel status feedback message. In some examples, the data transfer component 1025 may transmit the shared channel transmission based on receiving the signaling indicating the relationship between the uplink channel matrix and the downlink channel matrix.

In some examples, the data transfer component 1025 may transmit the shared channel transmission based on the determined first channel matrix. In some examples, the data transfer component 1025 may transmit the shared channel transmission based on determining the precoding matrix index, where the shared channel transmission is a downlink shared channel transmission. In some examples, the data transfer component 1025 may receive a shared channel transmission as part of the data transfer based on transmitting the channel status feedback message and the third reference signal. In some examples, the data transfer component 1025 may receive a shared channel transmission based on transmitting the third reference signal. In some examples, the data transfer component 1025 may transmit a shared channel transmission based on receiving the third reference signal.

In some examples, the data transfer component 1025 may transmit the shared channel transmission based on determining the relationship between the uplink channel matrix and the downlink channel matrix. In some examples, the data transfer component 1025 may transmit the shared channel transmission based on determining the first channel matrix. In some examples, the data transfer component 1025 may transmit the shared channel transmission based on determining the precoding matrix index, where the shared channel transmission is a downlink shared channel transmission. In some cases, the first training procedure and the second training procedure are training procedures of a set of periodic training procedures for the first device. In some cases, the first training procedure and the second training procedure are training procedures of a set of periodic training procedures for the first device.

In some cases, the data transfer component 1025 may be a processor (e.g., a transceiver processor, a radio processor, or a receiver processor). The processor may be coupled with memory and execute instructions stored in the memory that enable the processor to perform or facilitate shared channel transmission or reception described herein.

The channel matrix component 1030 may receive signaling indicating a relationship between an uplink channel matrix and a downlink channel matrix. In some examples, the channel matrix component 1030 may determine a first channel matrix based on the relationship between the uplink channel matrix and the downlink channel matrix. In some examples, the channel matrix component 1030 may determine a second channel matrix based on receiving the third reference signal. In some examples, the channel matrix component 1030 may determine the first channel matrix based on the second channel matrix.

In some examples, the channel matrix component 1030 may determine a channel matrix based on the first reference signal, where initiating the data transfer is based on the channel status feedback message including the indication of the channel matrix. In some examples, the channel matrix component 1030 may determine one or more parameters, one or more coefficients, or a combination thereof usable to derive a channel matrix based on the first reference signal, where initiating the data transfer is based on the channel status feedback message including an indication of the one or more parameters, an indication of the one or more coefficients, or a combination thereof. In some examples, the channel matrix component 1030 may determine a relationship between an uplink channel matrix and a downlink channel matrix. In some examples, the channel matrix component 1030 may transmit signaling indicating the relationship between the uplink channel matrix and the downlink channel matrix to the second device, where receiving the shared channel transmission is based on transmitting the signaling indicating the relationship between the uplink channel matrix and the downlink channel matrix.

In some examples, the channel matrix component 1030 may determine a relationship between an uplink channel matrix and a downlink channel matrix based on receiving the channel status feedback message. In some examples, the channel matrix component 1030 may determine a first channel matrix based on determining the relationship between the uplink channel matrix and the downlink channel matrix. In some examples, the channel matrix component 1030 may determine a second channel matrix based on receiving the second reference signal. In some examples, the channel matrix component 1030 may determine the first channel matrix based on the second channel matrix.

In some examples, the channel matrix component 1030 may determine a channel matrix based on the second reference signal, where initiating the data transfer is based on the channel status feedback message including the indication of the channel matrix. In some examples, the channel matrix component 1030 may determine one or more parameters, one or more coefficients, or a combination thereof usable to derive a channel matrix based on the second reference signal, where initiating the data transfer is based on the channel status feedback message including an indication of the one or more parameters, an indication of the one or more coefficients, or a combination thereof.

In some cases, the first channel matrix is the uplink channel matrix and the second channel matrix is the downlink channel matrix. In some cases, the first channel matrix is the downlink channel matrix and the second channel matrix is the uplink channel matrix. In some cases, the relationship between the uplink channel matrix and the downlink channel matrix is received via a medium access control control element. In some cases, the relationship between the uplink channel matrix and the downlink channel matrix is received via an uplink shared channel transmission. In some cases, the relationship between the uplink channel matrix and the downlink channel matrix is transmitted via medium access control control element signaling. In some cases, the relationship between the uplink channel matrix and the downlink channel matrix is transmitted via an uplink shared channel transmission. In some cases, the first channel matrix is the uplink channel matrix and where the second channel matrix is the downlink channel matrix. In some cases, the first channel matrix is the downlink channel matrix and where the second channel matrix is the uplink channel matrix.

In some cases, the channel matrix component 1030 may be a processor (e.g., a transceiver processor, a radio processor, or a receiver processor). The processor may be coupled with memory and execute instructions stored in the memory that enable the processor to perform or facilitate channel matrix determination and reception and transmission of relationships between channel matrices as discussed herein.

The precoding component 1035 may determine a precoding matrix index based on the third reference signal and transmitting the channel status feedback message. In some examples, the precoding component 1035 may determine a precoding matrix index based on the second reference signal and receiving the channel status feedback message. In some cases, the precoding component may be a processor. The processor may be coupled with memory and execute instructions stored in the memory that enable the processor to perform or facilitate precoding described herein.

The SRI component 1040 may receive a scheduling request indicator from the second device based on transmitting the precoded fourth reference signal. In some examples, the SRI component 1040 may transmit a scheduling request indicator based on transmitting the channel status feedback message and the third reference signal, where receiving the shared channel transmission is based on transmitting the scheduling request indicator. In some examples, the SRI component 1040 may transmit a scheduling request indicator based on receiving the channel status feedback message and transmitting the third reference signal, where receiving the shared channel transmission is based on transmitting the scheduling request indicator. In some examples, the SRI component 1040 may receive a scheduling request indicator based on receiving the channel status feedback message and the third reference signal, where transmitting the shared channel transmission is based on the scheduling request indicator. In some cases, the scheduling request indicator is received via downlink control information. In some cases, the scheduling request indicator is transmitted via downlink control information. In some cases, the scheduling request indicator is transmitted via downlink control information. In some cases, the scheduling request indicator is received via downlink control information.

In some cases, the SRI component 1040 may be a processor (e.g., a transceiver processor, a radio processor, or a receiver processor). The processor may be coupled with memory and execute instructions stored in the memory that enable the processor to perform or facilitate transmission and reception of SRI as discussed herein.

Figure 11:
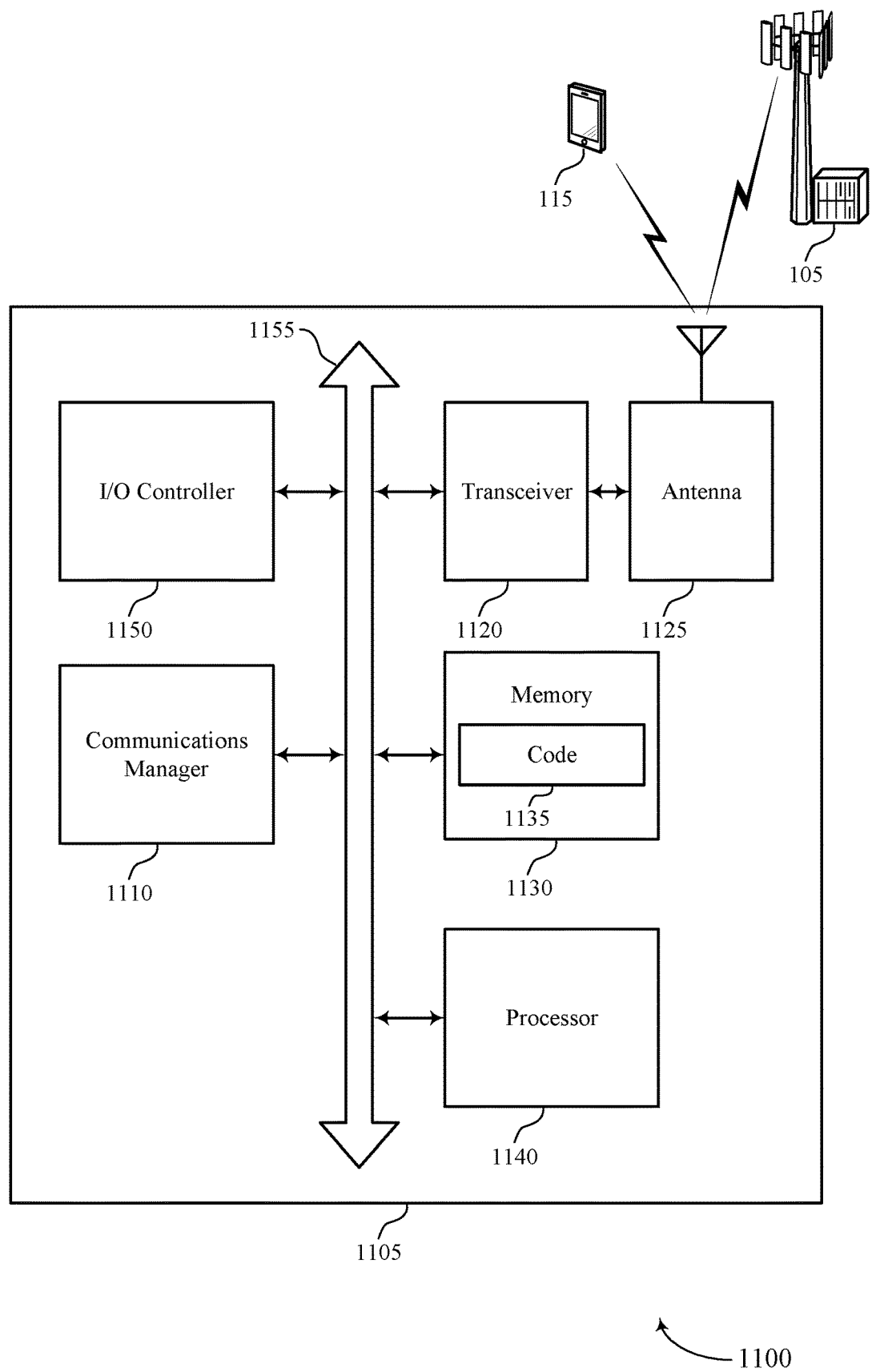
FIG. 11 shows a diagram of a system including a user equipment (UE) that supports coordination for partial reciprocity estimation in accordance with aspects of the present disclosure.

FIG. 11 shows a diagram of a system 1100 including a device 1105 that supports coordination for partial reciprocity estimation in accordance with aspects of the present disclosure. The device 1105 may be an example of or include the components of device 805, device 905, a UE 115, or a wireless device 205 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may receive a first reference signal from a second device, transmit the second reference signal and the channel status feedback message to the second device, generate a channel status feedback message based on the first reference signal, bundle a second reference signal and the channel status feedback message, and initiate a data transfer with the second device based on transmitting the second reference signal and the channel status feedback message. The communications manager 1110 may also transmit a first reference signal to a second device, receive a second reference signal bundled with a channel status feedback message from the second device based on transmitting the first reference signal, and initiate data transfer with the second device based on receiving the second reference signal bundled with the channel status feedback message.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting coordination for partial reciprocity estimation).

Based on more accurately determining the channel matrix for the channel for transmitting the shared channel transmission, a processor 1140 may efficiently transmit the shared channel transmission. As such, the processor may be ready to respond more efficiently through the reduction of a ramp up in processing power.

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
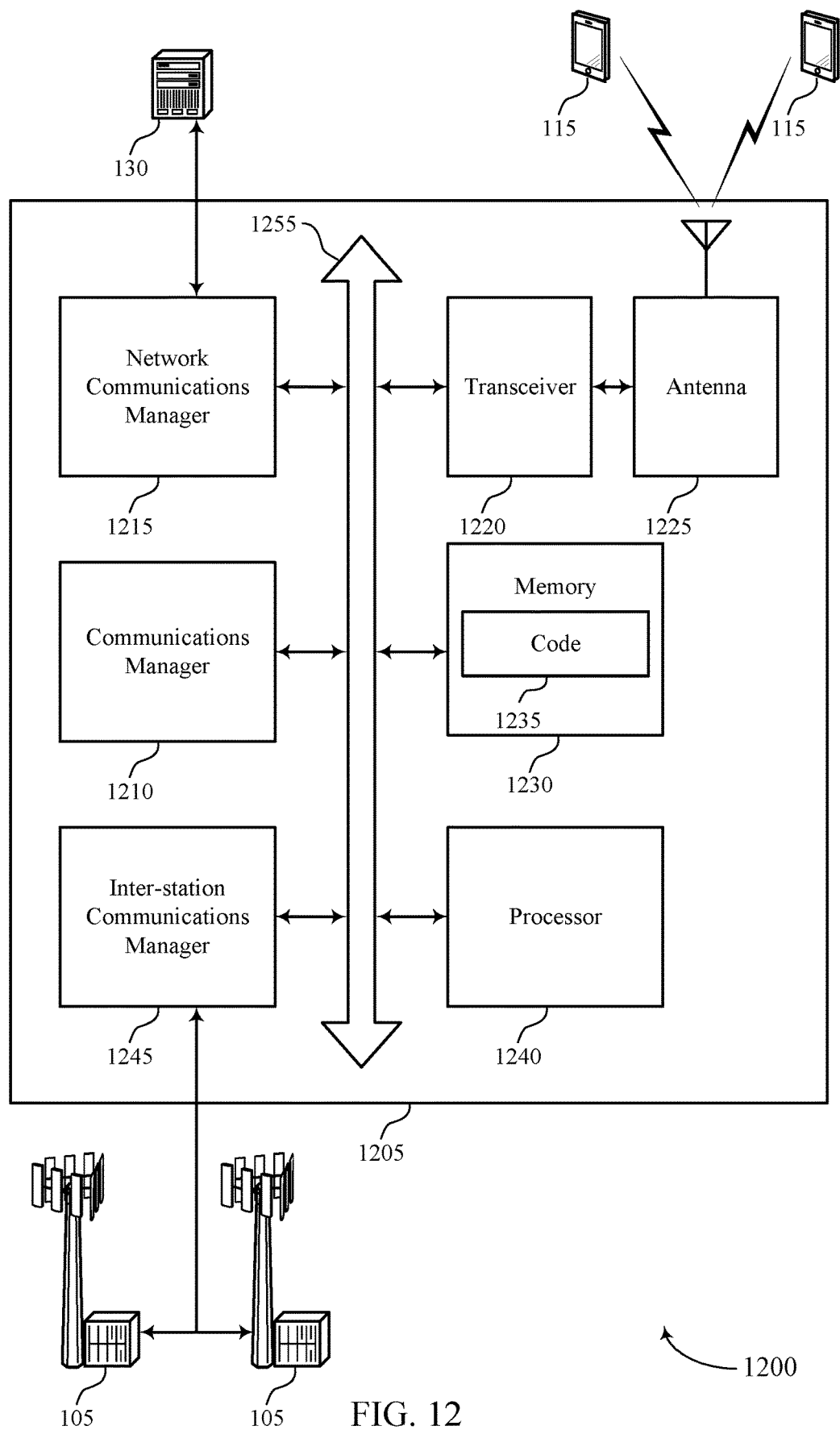
FIG. 12 shows a diagram of a system including a base station that supports coordination for partial reciprocity estimation in accordance with aspects of the present disclosure.

FIG. 12 shows a diagram of a system 1200 including a device 1205 that supports coordination for partial reciprocity estimation in accordance with aspects of the present disclosure. The device 1205 may be an example of or include the components of device 805, device 905, a base station 105, or a wireless device 205 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may receive a first reference signal from a second device, transmit the second reference signal and the channel status feedback message to the second device, generate a channel status feedback message based on the first reference signal, bundle a second reference signal and the channel status feedback message, and initiate a data transfer with the second device based on transmitting the second reference signal and the channel status feedback message. The communications manager 1210 may also transmit a first reference signal to a second device, receive a second reference signal bundled with a channel status feedback message from the second device based on transmitting the first reference signal, and initiate data transfer with the second device based on receiving the second reference signal bundled with the channel status feedback message.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting coordination for partial reciprocity estimation).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
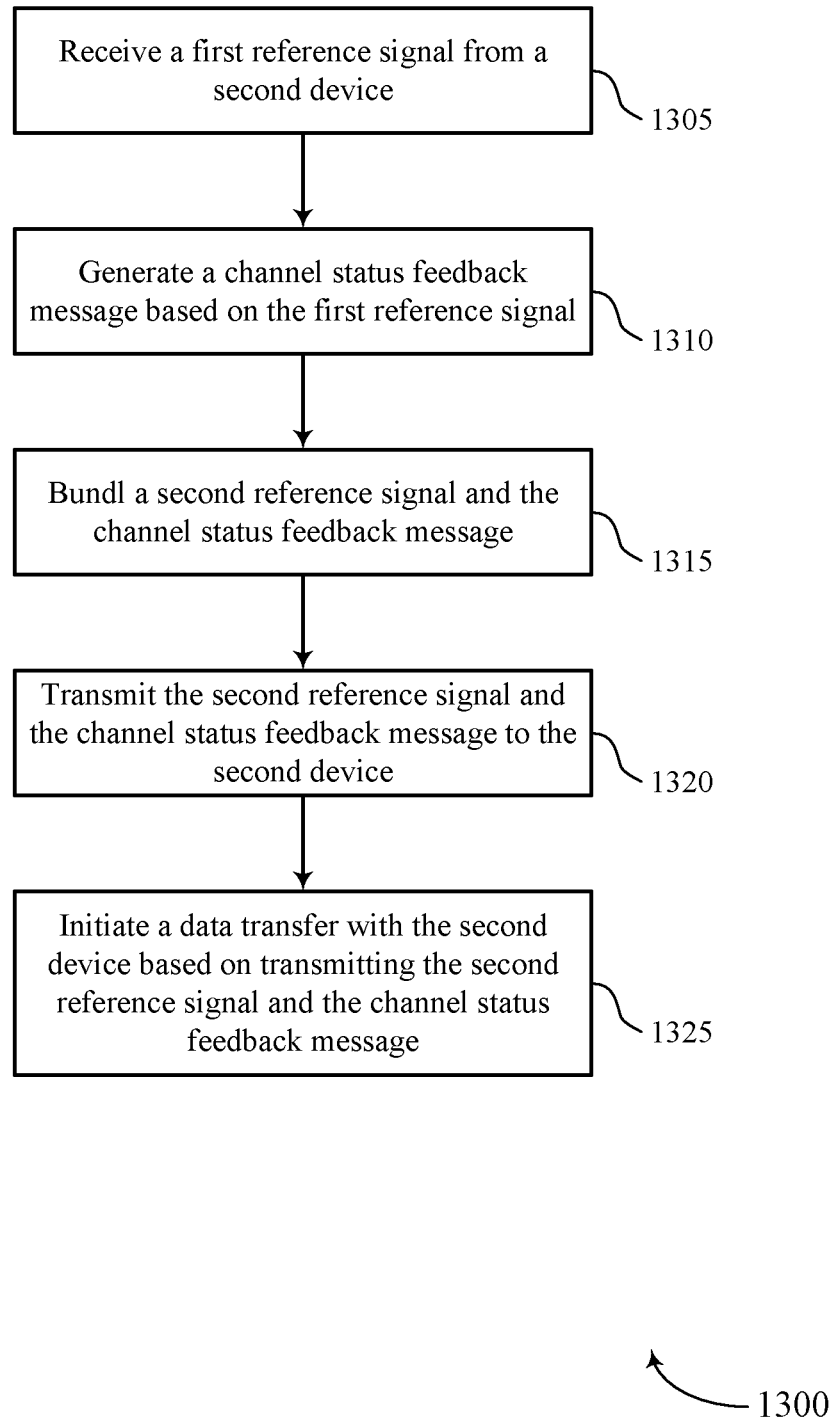
FIGS. 13 through 18 show flowcharts illustrating methods that support coordination for partial reciprocity estimation in accordance with aspects of the present disclosure.

FIG. 13 shows a flowchart illustrating a method 1300 that supports coordination for partial reciprocity estimation in accordance with aspects of the present disclosure. The operations of method 1300 may be implemented by a UE 115, base station 105, wireless device 205 or their components as described herein. For example, the operations of method 1300 may be performed by a communications manager as described with reference to FIGS. 8 through 12. In some examples, a UE, base station, or wireless device may execute a set of instructions to control the functional elements of the UE, base station, or wireless device to perform the functions described below. Additionally or alternatively, a UE, base station, or wireless device may perform aspects of the functions described below using special-purpose hardware.

At 1305, the UE, base station, or wireless device may receive a first reference signal from a second device. The operations of 1305 may be performed according to the methods described herein. In some examples, aspects of the operations of 1305 may be performed by a reference signal component as described with reference to FIGS. 8 through 12.

At 1310, the UE, base station, or wireless device may generate a channel status feedback message based on the first reference signal. The operations of 1310 may be performed according to the methods described herein. In some examples, aspects of the operations of 1310 may be performed by a CSF generator as described with reference to FIGS. 8 through 12.

At 1315, the UE, base station, or wireless device may bundle a second reference signal and the channel status feedback message. The operations of 1315 may be performed according to the methods described herein. In some examples, aspects of the operations of 1315 may be performed by a bundling component as described with reference to FIGS. 8 through 12.

At 1320, the UE, base station, or wireless device may transmit the second reference signal and the channel status feedback message to the second device. The operations of 1320 may be performed according to the methods described herein. In some examples, aspects of the operations of 1320 may be performed by a reference signal component as described with reference to FIGS. 8 through 12.

At 1325, the UE, base station, or wireless device may initiate a data transfer with the second device based on transmitting the second reference signal and the channel status feedback message. The operations of 1325 may be performed according to the methods described herein. In some examples, aspects of the operations of 1325 may be performed by a data transfer component as described with reference to FIGS. 8 through 12.

Figure 14:
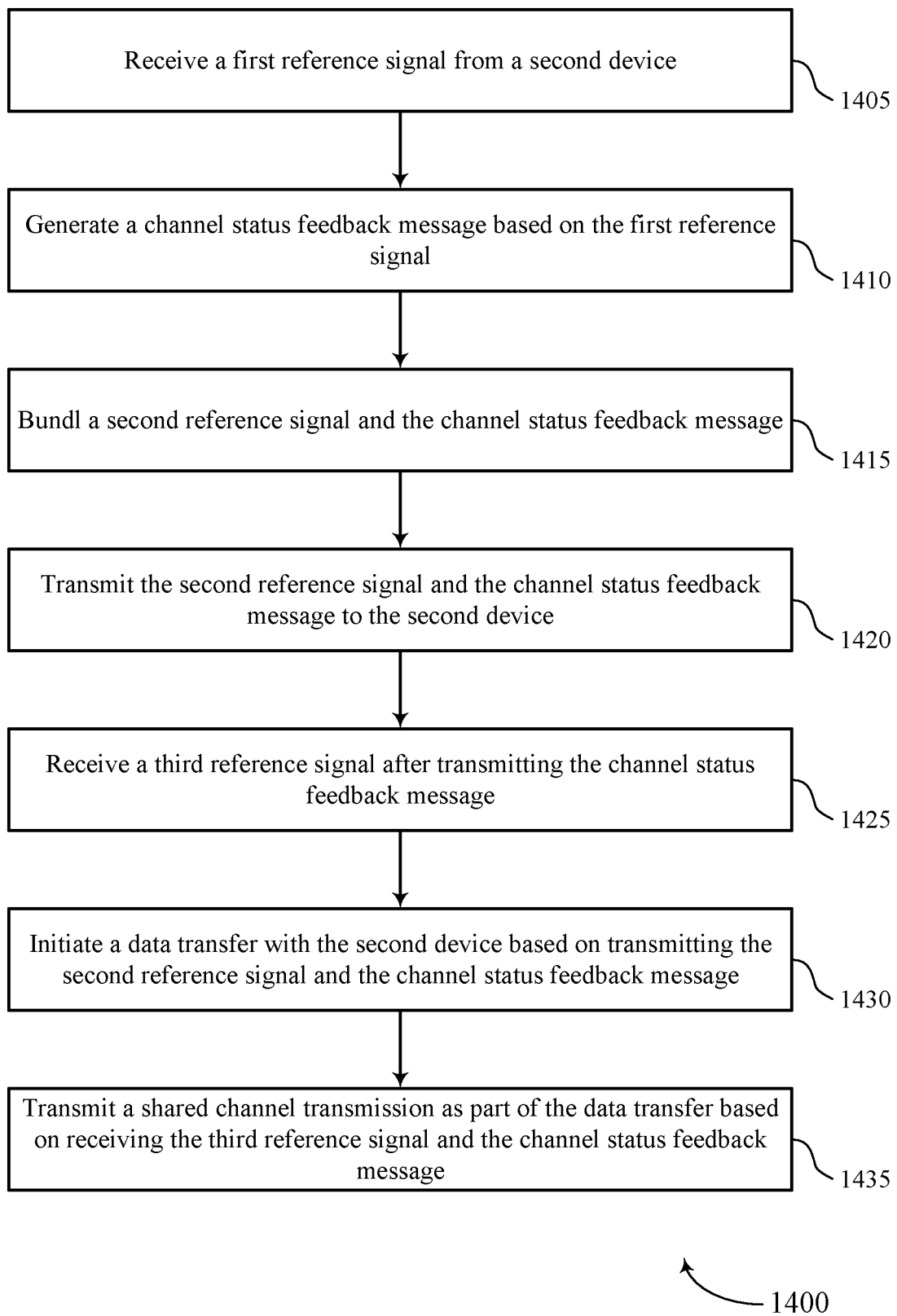

FIG. 14 shows a flowchart illustrating a method 1400 that supports coordination for partial reciprocity estimation in accordance with aspects of the present disclosure. The operations of method 1400 may be implemented by a UE 115, base station 105, wireless device 205, or their components as described herein. For example, the operations of method 1400 may be performed by a communications manager as described with reference to FIGS. 8 through 12. In some examples, a UE, base station, or wireless device may execute a set of instructions to control the functional elements of the UE, base station, or wireless device to perform the functions described below. Additionally or alternatively, a UE, base station, or wireless device may perform aspects of the functions described below using special-purpose hardware.

At 1405, the UE, base station, or wireless device may receive a first reference signal from a second device. The operations of 1405 may be performed according to the methods described herein. In some examples, aspects of the operations of 1405 may be performed by a reference signal component as described with reference to FIGS. 8 through 12.

At 1410, the UE, base station, or wireless device may generate a channel status feedback message based on the first reference signal. The operations of 1410 may be performed according to the methods described herein. In some examples, aspects of the operations of 1410 may be performed by a CSF generator as described with reference to FIGS. 8 through 12.

At 1415, the UE, base station, or wireless device may bundle a second reference signal and the channel status feedback message. The operations of 1415 may be performed according to the methods described herein. In some examples, aspects of the operations of 1415 may be performed by a bundling component as described with reference to FIGS. 8 through 12.

At 1420, the UE, base station, or wireless device may transmit the second reference signal and the channel status feedback message to the second device. The operations of 1420 may be performed according to the methods described herein. In some examples, aspects of the operations of 1420 may be performed by a reference signal component as described with reference to FIGS. 8 through 12.

At 1425, the UE, base station, or wireless device may receive a third reference signal after transmitting the channel status feedback message. The operations of 1425 may be performed according to the methods described herein. In some examples, aspects of the operations of 1425 may be performed by a reference signal component as described with reference to FIGS. 8 through 12.

At 1430, the UE, base station, or wireless device may initiate a data transfer with the second device based on transmitting the second reference signal and the channel status feedback message. The operations of 1430 may be performed according to the methods described herein. In some examples, aspects of the operations of 1430 may be performed by a data transfer component as described with reference to FIGS. 8 through 12.

At 1435, the UE, base station, or wireless device may transmit a shared channel transmission as part of the data transfer based on receiving the third reference signal and the channel status feedback message. The operations of 1435 may be performed according to the methods described herein. In some examples, aspects of the operations of 1435 may be performed by a data transfer component as described with reference to FIGS. 8 through 12.

Figure 15:
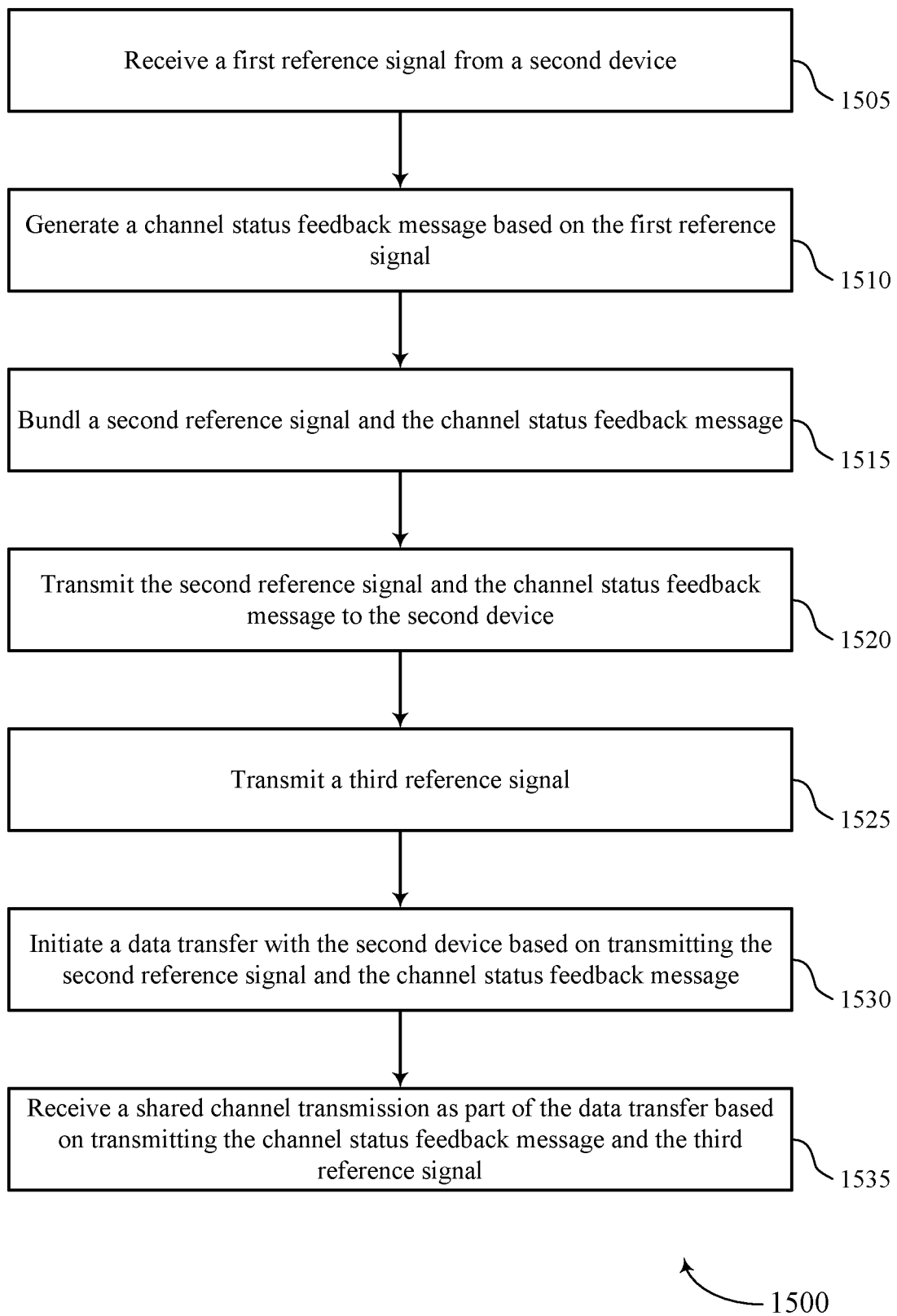

FIG. 15 shows a flowchart illustrating a method 1500 that supports coordination for partial reciprocity estimation in accordance with aspects of the present disclosure. The operations of method 1500 may be implemented by a UE 115, base station 105, wireless device 205 or their components as described herein. For example, the operations of method 1500 may be performed by a communications manager as described with reference to FIGS. 8 through 12. In some examples, a UE, base station, or wireless device may execute a set of instructions to control the functional elements of the UE, base station, or wireless device to perform the functions described below. Additionally or alternatively, a UE, base station, or wireless device may perform aspects of the functions described below using special-purpose hardware.

At 1505, the UE, base station, or wireless device may receive a first reference signal from a second device. The operations of 1505 may be performed according to the methods described herein. In some examples, aspects of the operations of 1505 may be performed by a reference signal component as described with reference to FIGS. 8 through 12.

At 1510, the UE, base station, or wireless device may generate a channel status feedback message based on the first reference signal. The operations of 1510 may be performed according to the methods described herein. In some examples, aspects of the operations of 1510 may be performed by a CSF generator as described with reference to FIGS. 8 through 12.

At 1515, the UE, base station, or wireless device may bundle a second reference signal and the channel status feedback message. The operations of 1515 may be performed according to the methods described herein. In some examples, aspects of the operations of 1515 may be performed by a bundling component as described with reference to FIGS. 8 through 12.

At 1520, the UE, base station, or wireless device may transmit the second reference signal and the channel status feedback message to the second device. The operations of 1520 may be performed according to the methods described herein. In some examples, aspects of the operations of 1520 may be performed by a reference signal component as described with reference to FIGS. 8 through 12.

At 1525, the UE, base station, or wireless device may transmit a third reference signal. The operations of 1525 may be performed according to the methods described herein. In some examples, aspects of the operations of 1525 may be performed by a reference signal component as described with reference to FIGS. 8 through 12.

At 1530, the UE, base station, or wireless device may initiate a data transfer with the second device based on transmitting the second reference signal and the channel status feedback message. The operations of 1530 may be performed according to the methods described herein. In some examples, aspects of the operations of 1530 may be performed by a data transfer component as described with reference to FIGS. 8 through 12.

At 1535, the UE, base station, or wireless device may receive a shared channel transmission as part of the data transfer based on transmitting the channel status feedback message and the third reference signal. The operations of 1535 may be performed according to the methods described herein. In some examples, aspects of the operations of 1535 may be performed by a data transfer component as described with reference to FIGS. 8 through 12.

Figure 16:
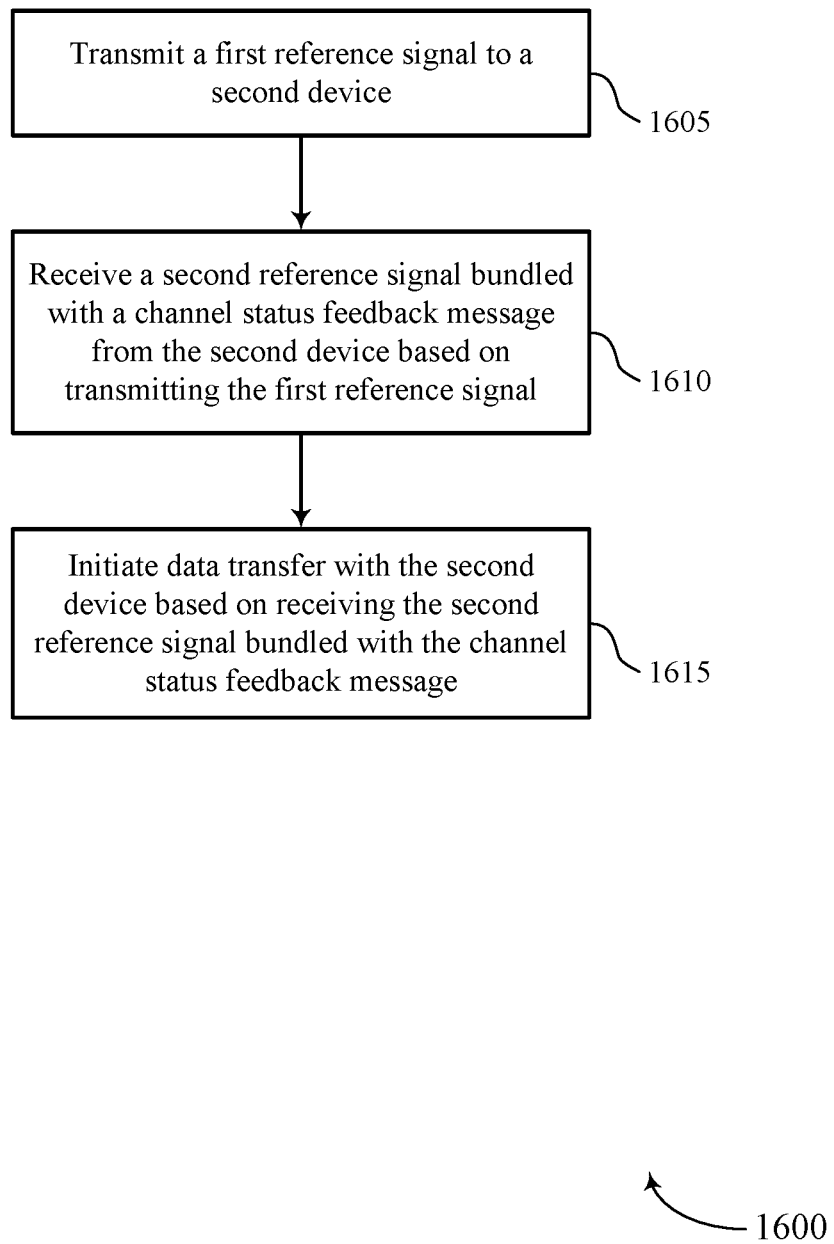

FIG. 16 shows a flowchart illustrating a method 1600 that supports coordination for partial reciprocity estimation in accordance with aspects of the present disclosure. The operations of method 1600 may be implemented by a UE 115, base station 105, wireless device 205 or their components as described herein. For example, the operations of method 1600 may be performed by a communications manager as described with reference to FIGS. 8 through 12. In some examples, a UE, base station, or wireless device may execute a set of instructions to control the functional elements of the UE, base station, or wireless device to perform the functions described below. Additionally or alternatively, a UE, base station, or wireless device may perform aspects of the functions described below using special-purpose hardware.

At 1605, the UE, base station, or wireless device may transmit a first reference signal to a second device. The operations of 1605 may be performed according to the methods described herein. In some examples, aspects of the operations of 1605 may be performed by a reference signal component as described with reference to FIGS. 8 through 12.

At 1610, the UE, base station, or wireless device may receive a second reference signal bundled with a channel status feedback message from the second device based on transmitting the first reference signal. The operations of 1610 may be performed according to the methods described herein. In some examples, aspects of the operations of 1610 may be performed by a reference signal component as described with reference to FIGS. 8 through 12.

At 1615, the UE, base station, or wireless device may initiate data transfer with the second device based on receiving the second reference signal bundled with the channel status feedback message. The operations of 1615 may be performed according to the methods described herein. In some examples, aspects of the operations of 1615 may be performed by a data transfer component as described with reference to FIGS. 8 through 12.

Figure 17:
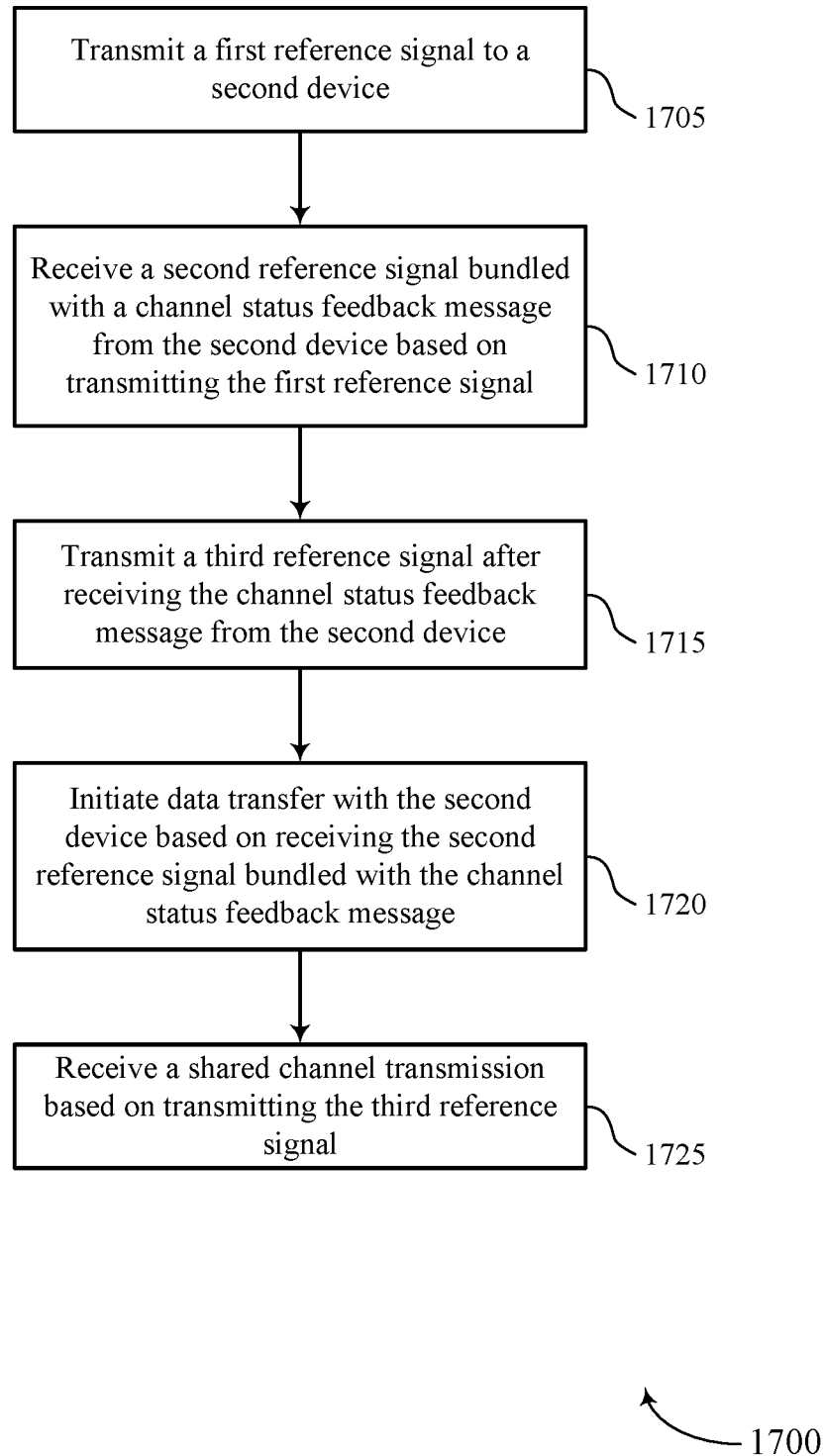

FIG. 17 shows a flowchart illustrating a method 1700 that supports coordination for partial reciprocity estimation in accordance with aspects of the present disclosure. The operations of method 1700 may be implemented by a UE 115, base station 105, wireless device 205 or their components as described herein. For example, the operations of method 1700 may be performed by a communications manager as described with reference to FIGS. 8 through 12. In some examples, a UE, base station, or wireless device may execute a set of instructions to control the functional elements of the UE, base station, or wireless device to perform the functions described below. Additionally or alternatively, a UE, base station, or wireless device may perform aspects of the functions described below using special-purpose hardware.

At 1705, the UE, base station, or wireless device may transmit a first reference signal to a second device. The operations of 1705 may be performed according to the methods described herein. In some examples, aspects of the operations of 1705 may be performed by a reference signal component as described with reference to FIGS. 8 through 12.

At 1710, the UE, base station, or wireless device may receive a second reference signal bundled with a channel status feedback message from the second device based on transmitting the first reference signal. The operations of 1710 may be performed according to the methods described herein. In some examples, aspects of the operations of 1710 may be performed by a reference signal component as described with reference to FIGS. 8 through 12.

At 1715, the UE, base station, or wireless device may transmit a third reference signal after receiving the channel status feedback message from the second device. The operations of 1715 may be performed according to the methods described herein. In some examples, aspects of the operations of 1715 may be performed by a reference signal component as described with reference to FIGS. 8 through 12.

At 1720, the UE, base station, or wireless device may initiate data transfer with the second device based on receiving the second reference signal bundled with the channel status feedback message. The operations of 1720 may be performed according to the methods described herein. In some examples, aspects of the operations of 1720 may be performed by a data transfer component as described with reference to FIGS. 8 through 12.

At 1725, the UE, base station, or wireless device may receive a shared channel transmission based on transmitting the third reference signal. The operations of 1725 may be performed according to the methods described herein. In some examples, aspects of the operations of 1725 may be performed by a data transfer component as described with reference to FIGS. 8 through 12.

Figure 18:
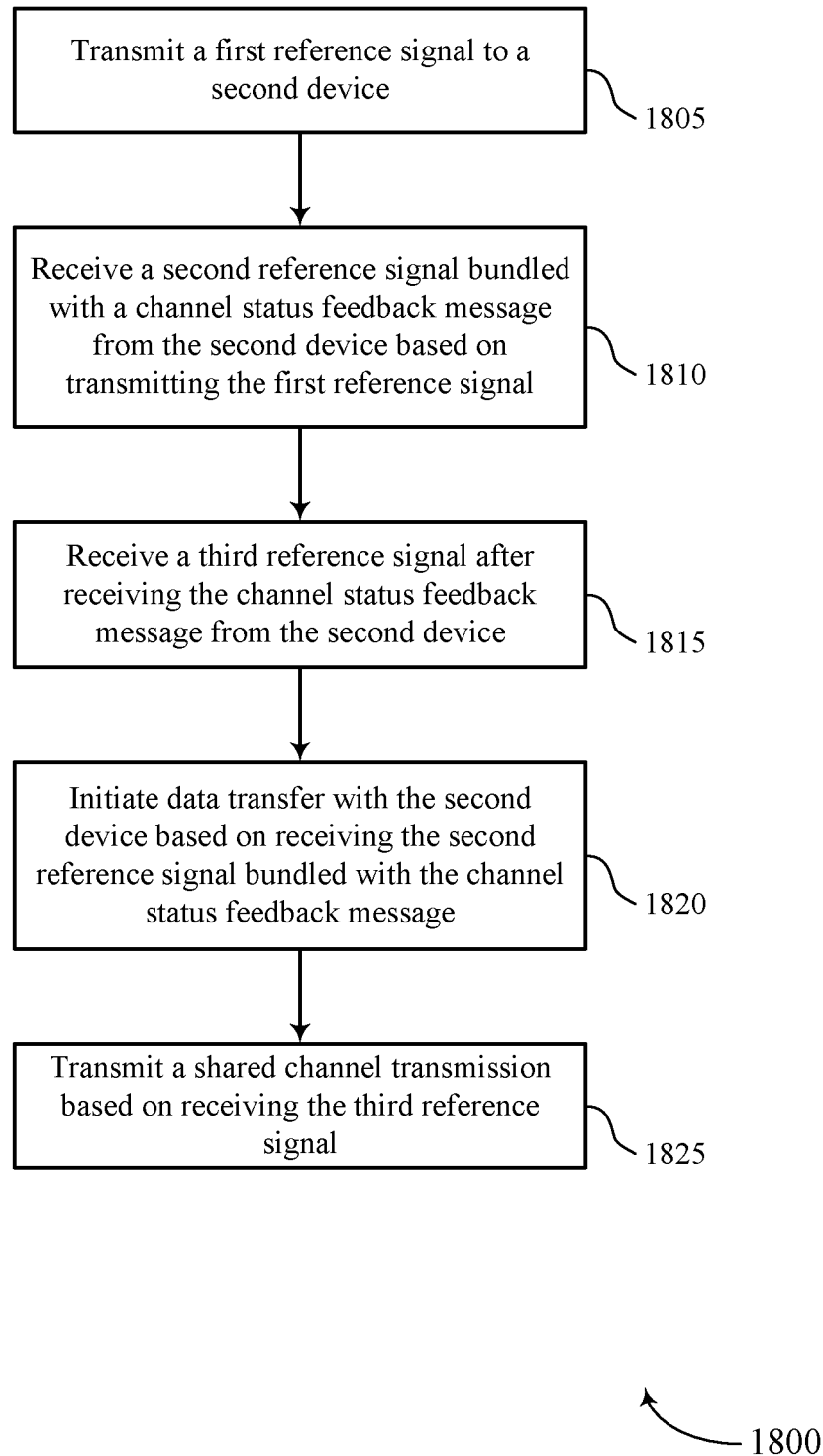

FIG. 18 shows a flowchart illustrating a method 1800 that supports coordination for partial reciprocity estimation in accordance with aspects of the present disclosure. The operations of method 1800 may be implemented by a UE 115, base station 105, wireless device 205, or their components as described herein. For example, the operations of method 1800 may be performed by a communications manager as described with reference to FIGS. 8 through 12. In some examples, a UE, base station, or wireless device may execute a set of instructions to control the functional elements of the UE, base station, or wireless device to perform the functions described below. Additionally or alternatively, a UE, base station, or wireless device may perform aspects of the functions described below using special-purpose hardware.

At 1805, the UE, base station, or wireless device may transmit a first reference signal to a second device. The operations of 1805 may be performed according to the methods described herein. In some examples, aspects of the operations of 1805 may be performed by a reference signal component as described with reference to FIGS. 8 through 12.

At 1810, the UE, base station, or wireless device may receive a second reference signal bundled with a channel status feedback message from the second device based on transmitting the first reference signal. The operations of 1810 may be performed according to the methods described herein. In some examples, aspects of the operations of 1810 may be performed by a reference signal component as described with reference to FIGS. 8 through 12.

At 1815, the UE, base station, or wireless device may receive a third reference signal after receiving the channel status feedback message from the second device. The operations of 1815 may be performed according to the methods described herein. In some examples, aspects of the operations of 1815 may be performed by a reference signal component as described with reference to FIGS. 8 through 12.

At 1820, the UE, base station, or wireless device may initiate data transfer with the second device based on receiving the second reference signal bundled with the channel status feedback message. The operations of 1820 may be performed according to the methods described herein. In some examples, aspects of the operations of 1820 may be performed by a data transfer component as described with reference to FIGS. 8 through 12.

At 1825, the UE, base station, or wireless device may transmit a shared channel transmission based on receiving the third reference signal. The operations of 1825 may be performed according to the methods described herein. In some examples, aspects of the operations of 1825 may be performed by a data transfer component as described with reference to FIGS. 8 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
   receiving a first reference signal from a second device, wherein the first reference signal comprises one of a sounding reference signal or a channel state information reference signal;
   generating a channel status feedback message based at least in part on the first reference signal;
   bundling a second reference signal and the channel status feedback message, wherein the second reference signal comprises a different one of the sounding reference signal or the channel state information reference signal;
   transmitting the second reference signal and the channel status feedback message to the second device; and
   initiating a data transfer with the second device based at least in part on transmitting the second reference signal and the channel status feedback message.

2. The method of claim 1, further comprising:
   transmitting a third reference signal;
   receiving a shared channel transmission as part of the data transfer based at least in part on transmitting the channel status feedback message and the third reference signal; and
   receiving a fourth reference signal, wherein the third reference signal is based at least in part on transmitting the third reference signal and the channel status feedback message.

3. The method of claim 2, further comprising:
   transmitting a scheduling request indicator based at least in part on transmitting the channel status feedback message and the third reference signal, wherein receiving the shared channel transmission is based at least in part on transmitting the scheduling request indicator, and wherein the scheduling request indicator is transmitted via downlink control information.

4. The method of claim 1, wherein the first reference signal is received and the second reference signal and the channel status feedback message are transmitted as part of a first training procedure, and wherein a second training procedure performed after the first training procedure comprises:

receiving a third reference signal from the second device;
generating a second channel status feedback message based at least in part on receiving the third reference signal;
bundling a fourth reference signal and the second channel status feedback message; and
transmitting the fourth reference signal and the second channel status feedback message to the second device.

5. The method of claim 1, wherein the second reference signal and the channel status feedback message are transmitted as part of a training procedure, and further comprising:
transmitting a plurality of reference signals comprising the second reference signal and a plurality of channel status feedback messages comprising the channel status feedback message as part of the training procedure, wherein each reference signal of the plurality of reference signals is bundled with a corresponding channel status feedback message of the plurality of channel status feedback messages, and wherein initiating the data transfer is based at least in part on transmitting the plurality of reference signals and the plurality of channel status feedback messages.

6. The method of claim 1, further comprising:
determining a channel matrix based at least in part on the first reference signal, wherein initiating the data transfer is based at least in part on the channel status feedback message comprising an indication of the channel matrix.

7. The method of claim 1, further comprising:
determining one or more parameters, one or more coefficients, or a combination thereof usable to derive a channel matrix based at least in part on the first reference signal, wherein initiating the data transfer is based at least in part on the channel status feedback message comprising an indication of the one or more parameters, an indication of the one or more coefficients, or a combination thereof.

8. A method for wireless communications at a first device, comprising:
receiving a first reference signal from a second device;
generating a channel status feedback message based at least in part on the first reference signal;
bundling a second reference signal and the channel status feedback message;
transmitting the second reference signal and the channel status feedback message to the second device;
receiving a third reference signal after transmitting the channel status feedback message;
initiating a data transfer with the second device based at least in part on transmitting the second reference signal and the channel status feedback message; and
transmitting a shared channel transmission as part of the data transfer based at least in part on receiving the third reference signal and transmitting the channel status feedback message.

9. The method of claim 8, further comprising:
receiving signaling indicating a relationship between an uplink channel matrix and a downlink channel matrix; and
transmitting the shared channel transmission based at least in part on receiving the signaling indicating the relationship between the uplink channel matrix and the downlink channel matrix.

10. The method of claim 9, further comprising:
determining a first channel matrix based at least in part on the relationship between the uplink channel matrix and the downlink channel matrix;
transmitting the shared channel transmission based at least in part on the determined first channel matrix;
determining a second channel matrix based at least in part on receiving the third reference signal; and
determining the first channel matrix based at least in part on the second channel matrix.

11. The method of claim 8, further comprising:
determining a precoding matrix index based at least in part on the third reference signal and transmitting the channel status feedback message; and
transmitting the shared channel transmission based at least in part on determining the precoding matrix index, wherein the shared channel transmission is a downlink shared channel transmission.

12. The method of claim 8, further comprising:
transmitting a fourth reference signal to the second device, wherein the fourth reference signal is precoded based at least in part on receiving the third reference signal.

13. The method of claim 12, further comprising:
receiving a scheduling request indicator from the second device based at least in part on transmitting the precoded fourth reference signal, wherein the scheduling request indicator is received via downlink control information.

14. A method for wireless communications at a first device, comprising:
transmitting a first reference signal to a second device, wherein the first reference signal comprises one of a sounding reference signal or a channel state information reference signal;
receiving a second reference signal bundled with a channel status feedback message from the second device based at least in part on transmitting the first reference signal, wherein the second reference signal comprises a different one of the sounding reference signal or the channel state information reference signal; and
initiating data transfer with the second device based at least in part on receiving the second reference signal bundled with the channel status feedback message.

15. The method of claim 14, further comprising:
transmitting a third reference signal after receiving the channel status feedback message from the second device; and
receiving a shared channel transmission based at least in part on transmitting the third reference signal.

16. The method of claim 15, further comprising:
determining a relationship between an uplink channel matrix and a downlink channel matrix; and
transmitting signaling indicating the relationship between the uplink channel matrix and the downlink channel matrix to the second device, wherein receiving the shared channel transmission is based at least in part on transmitting the signaling indicating the relationship between the uplink channel matrix and the downlink channel matrix.

17. The method of claim 15, further comprising:
receiving a fourth reference signal, wherein the fourth reference signal is based at least in part on transmitting the third reference signal and receiving the channel status feedback message.

18. The method of claim 15, further comprising:
transmitting a scheduling request indicator based at least in part on receiving the channel status feedback message and transmitting the third reference signal, wherein receiving the shared channel transmission is based at least in part on transmitting the scheduling request indicator, and wherein the scheduling request indicator is transmitted via downlink control information.

19. The method of claim 14, further comprising:
receiving a third reference signal after receiving the channel status feedback message from the second device; and
transmitting a shared channel transmission based at least in part on receiving the third reference signal.

20. The method of claim 19, further comprising:
determining a relationship between an uplink channel matrix and a downlink channel matrix based at least in part on receiving the channel status feedback message; and
transmitting the shared channel transmission based at least in part on determining the relationship between the uplink channel matrix and the downlink channel matrix.

21. The method of claim 20, further comprising:
determining a first channel matrix based at least in part on determining the relationship between the uplink channel matrix and the downlink channel matrix;
transmitting the shared channel transmission based at least in part on determining the first channel matrix;
determining a second channel matrix based at least in part on receiving the second reference signal; and
determining the first channel matrix based at least in part on the second channel matrix.

22. The method of claim 19, further comprising:
determining a precoding matrix index based at least in part on the second reference signal and receiving the channel status feedback message; and
transmitting the shared channel transmission based at least in part on determining the precoding matrix index, wherein the shared channel transmission is a downlink shared channel transmission.

23. The method of claim 19, further comprising:
transmitting a fourth reference signal to the second device, wherein the fourth reference signal is precoded based at least in part on receiving the third reference signal; and
receiving a scheduling request indicator based at least in part on receiving the channel status feedback message and the third reference signal, wherein transmitting the shared channel transmission is based at least in part on the scheduling request indicator, and wherein the scheduling request indicator is received via downlink control information.

24. The method of claim 14, wherein the first reference signal and the channel status feedback message are received as part of a first training procedure, and wherein a second training procedure performed after the first training procedure comprises:
transmitting a third reference signal to the second device; and
receiving a fourth reference signal bundled with a second channel status feedback message from the second device based at least in part on transmitting the third reference signal.

25. The method of claim 14, wherein the second reference signal and the channel status feedback message are received as part of a training procedure, and further comprising:
receiving a plurality of reference signals comprising the second reference signal and a plurality of channel status feedback messages comprising the channel status feedback message as part of the training procedure, wherein each reference signal of the plurality of reference signals is bundled with a corresponding channel status feedback message of the plurality of channel status feedback messages, and wherein initiating the data transfer is based at least in part on receiving the plurality of reference signals and the plurality of channel status feedback messages.

26. The method of claim 14, further comprising:
determining a channel matrix based at least in part on the second reference signal, wherein initiating the data transfer is based at least in part on the channel status feedback message comprising an indication of the channel matrix.

27. The method of claim 14, further comprising:
determining one or more parameters, one or more coefficients, or a combination thereof usable to derive a channel matrix based at least in part on the second reference signal, wherein initiating the data transfer is based at least in part on the channel status feedback message comprising an indication of the one or more parameters, an indication of the one or more coefficients, or a combination thereof.

28. An apparatus for wireless communications at a first device, comprising:
a processor,
memory coupled with the processor; and
instructions stored in the memory and operable, when executed by the processor, to cause the apparatus to:
receive a first reference signal from a second device, wherein the first reference signal comprises one of a sounding reference signal or a channel state information reference signal;
generate a channel status feedback message based at least in part on the first reference signal;
bundle a second reference signal and the channel status feedback message, wherein the second reference signal comprises a different one of the sounding reference signal or the channel state information reference signal;
transmit the second reference signal and the channel status feedback message to the second device; and
initiate a data transfer with the second device based at least in part on transmitting the second reference signal and the channel status feedback message.

29. An apparatus for wireless communications at a first device, comprising:
a processor,
memory coupled with the processor; and
instructions stored in the memory and operable, when executed by the processor, to cause the apparatus to:
transmit a first reference signal to a second device, wherein the first reference signal comprises one of a sounding reference signal or a channel state information reference signal;
receive a second reference signal bundled with a channel status feedback message from the second device based at least in part on transmitting the first reference signal, wherein the second reference signal comprises a different one of the sounding reference signal or the channel state information reference signal; and
initiate data transfer with the second device based at least in part on receiving the second reference signal bundled with the channel status feedback message.

30. An apparatus for wireless communications at a first device, comprising:
   a processor,
   memory coupled with the processor; and
   instructions stored in the memory and operable, when executed by the processor, to cause the apparatus to:
      receive a first reference signal from a second device;
      generate a channel status feedback message based at least in part on the first reference signal;
      bundle a second reference signal and the channel status feedback message;
      transmit the second reference signal and the channel status feedback message to the second device;
      receive a third reference signal after transmitting the channel status feedback message;
      initiate a data transfer with the second device based at least in part on transmitting the second reference signal and the channel status feedback message; and
      transmit a shared channel transmission as part of the data transfer based at least in part on receiving the third reference signal and transmitting the channel status feedback message.

\* \* \* \* \*